United States Patent
DeJarnette et al.

(10) Patent No.: US 11,317,026 B1
(45) Date of Patent: Apr. 26, 2022

(54) MOBILE IMAGING SYSTEMS AND METHODS UTILIZING ANGULAR VELOCITY IN MITIGATING ADVERSE JITTER EFFECTS

(71) Applicant: GENERAL ATOMICS AERONAUTICAL SYSTEMS, INC., San Diego, CA (US)

(72) Inventors: Drew F. DeJarnette, San Diego, CA (US); Patrick R. Mickel, San Diego, CA (US); Matthew C. Cristina, Oceanside, CA (US); Jason A. Paxton, Poway, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 62 days.

(21) Appl. No.: 16/997,684

(22) Filed: Aug. 19, 2020

(51) Int. Cl.
*H04N 5/232* (2006.01)
*B64C 39/02* (2006.01)

(52) U.S. Cl.
CPC ....... *H04N 5/23267* (2013.01); *B64C 39/024* (2013.01); *B64C 2201/127* (2013.01)

(58) Field of Classification Search
CPC ................................................ H04N 5/23267
See application file for complete search history.

(56) References Cited

U.S. PATENT DOCUMENTS

| | | | |
|---|---|---|---|
| 7,932,925 B2 | 4/2011 | Inbar | |
| 8,792,011 B2 | 7/2014 | Washisu | |
| 8,946,606 B1 | 2/2015 | Dennison | |
| 9,068,884 B1 | 6/2015 | Tillotson | |
| 9,143,689 B2 | 9/2015 | Georgy | |
| 9,239,468 B2 | 1/2016 | Webb | |
| 9,509,894 B1 | 11/2016 | Dyer | |
| 10,645,291 B1 * | 5/2020 | Mickel | H04N 5/2353 |
| 11,196,951 B2 * | 12/2021 | Watanabe | H04N 5/378 |

(Continued)

FOREIGN PATENT DOCUMENTS

GB     2532841     6/2016

OTHER PUBLICATIONS

U.S. Appl. No. 16/851,646, filed Apr. 17, 2020, Patrick R. Mickel.

(Continued)

*Primary Examiner* — Cynthia Segura
(74) *Attorney, Agent, or Firm* — Fitch, Even, Tabin & Flannery LLP

(57) ABSTRACT

Some embodiments provide enhanced resolution imaging systems. These systems comprise: a mounting configured to secure with a vehicle; an electro-optical image capture system configured to sequentially obtain a series of frames per second; and a first jitter compensation system comprising: an angular velocity sensor system to detect velocity of change of line of sight angular displacement of the image capture system; and an image capture control circuit is configured to: receive, in real-time, angular velocity data from the angular velocity sensor system; identify, during the frame, when an angular velocity is less than an angular velocity threshold; and activate, during the frame, exposure of the image capture system to illumination for at least one of: at least a minimum integration period of time during the frame, and while the angular velocity is less than the angular velocity threshold during the frame.

18 Claims, 11 Drawing Sheets

(56) References Cited

U.S. PATENT DOCUMENTS

| | | |
|---|---|---|
| 2007/0129853 A1 | 6/2007 | Greenfeld |
| 2008/0136923 A1 | 6/2008 | Inbar |
| 2010/0141503 A1 | 6/2010 | Baumatz |
| 2010/0238296 A1 | 9/2010 | Nakamura |
| 2011/0193977 A1 | 8/2011 | Yamada |
| 2013/0093905 A1* | 4/2013 | Saitsu ............... G06T 5/003 348/208.4 |
| 2014/0327789 A1 | 11/2014 | Tsuchiya |
| 2015/0215539 A1* | 7/2015 | Saitsu ............ H04N 5/23258 348/208.6 |
| 2015/0281587 A1* | 10/2015 | Furuta ................. B60R 1/00 348/240.2 |
| 2016/0198088 A1 | 7/2016 | Wang |
| 2016/0212349 A1* | 7/2016 | Imada ............ H04N 5/23261 |
| 2016/0327206 A1 | 11/2016 | Yang |
| 2016/0360086 A1 | 12/2016 | Dyer |
| 2017/0041548 A1 | 2/2017 | Robinson |
| 2017/0175948 A1 | 6/2017 | Zeise |
| 2017/0227162 A1 | 8/2017 | Saika |
| 2018/0027187 A1* | 1/2018 | Seki ............... H04N 5/232941 348/208.11 |

OTHER PUBLICATIONS

Holloway, J. et al.; "Flutter Shutter Video Camera for compressive sensiving of videos"; 2012 IEEE International Conference on Computational Photography (ICCP); https://ieeexplore.ieee.org/document/6215211/; Apr. 28-29, 2012; pp. 1-11.

Liu, C. et al.; "A Novel System for Correction of Relative Angular Displacement between Airborne Platform and UAV in Target Localization"; MDPI Open Access Journal—Sensors; www.mdpi.com/journal/sensors; Mar. 4, 2017; pp. 1-22.

U.S. Appl. No. 15/963,634; Notice of Allowance dated Jan. 2, 2020.

U.S. Appl. No. 15/963,634; Office Action dated Jul. 3, 2019.

Wang, M. et al.; "Image jitter detection and compensation using a high-frequency angular displacement method for Yaogan-26 remote sensing satellite"; Elsevier; ISPRS Journal of Photogrammetry and Remote Sensing; May 29, 2017; pp. 32-43.

Wikipedia; "Image Stabilization"; https://en.wikipedia.org/wiki/Image_stabilization; Feb. 15, 2017; pp. 1-6.

* cited by examiner

MOBILE IMAGING SYSTEMS AND METHODS UTILIZING ANGULAR VELOCITY IN MITIGATING ADVERSE JITTER EFFECTS

TECHNICAL FIELD

This invention relates generally to systems providing enhanced resolution imaging.

BACKGROUND

High resolution imaging is very important to many different commercial, military and other uses. There are many factors that can adversely affect the quality of such imaging. There is a need to improve the results of high-resolution image capturing.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
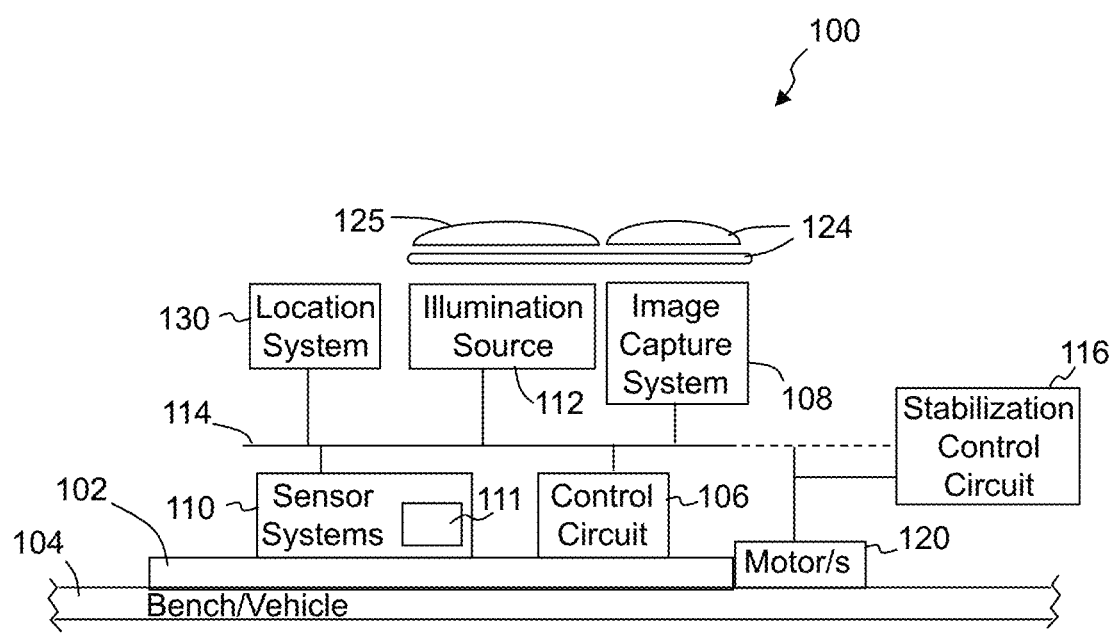
FIG. 1 illustrates a simplified block diagram of an exemplary enhanced resolution imaging system, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments," "an implementation," "some implementations," "some applications," or similar language means that a particular feature, structure, or characteristic described in connection with the embodiment is included in at least one embodiment of the present invention. Thus, appearances of the phrases "in one embodiment," "in an embodiment," "in some embodiments," "in some implementations," and similar language throughout this specification may, but do not necessarily, all refer to the same embodiment.

Generally speaking, pursuant to various embodiments, systems, apparatuses and methods are provided herein useful to capture enhanced resolution images even when the imaging system is subject to angular jitter, such as when capturing images by imaging systems mounted on a moving platform and/or a stationary platform subject to jitter and/or other noise. Some such moving platforms include, but are not limited to, aerial vehicles, ground based vehicles, water based vehicles, launched platforms, and other such platforms. In some embodiments, the system includes a mounting configured to secure with a stationary or moving platform (e.g., a vehicle), an electro-optical image capture system cooperated with the mounting, and a first jitter compensation system. The image capture system is configured to sequentially obtain a series of frames per second, and in some instances captures at least 20 or more frames per second. The first jitter compensation system implements at least a first technique of angular displacement mitigation to mitigate an effect of line of sight (LOS) angular displacement of the image capture system.

In some embodiments, the first jitter compensation system includes an angular velocity sensor system cooperated with the mounting, and is configured to detect velocity of change of LOS angular displacement of the image capture system caused by angular jitter noise. An optional illumination source system can be included in some embodiments, and is cooperated with the mounting. An image capture control circuit is communicatively coupled with the angular velocity sensor system, the illumination source system when included, and the image capture system. The image capture control circuit, during each frame of the series of frames, is configured to: receive, in real-time, angular velocity data from the angular velocity sensor system, and identify, in real-time during the frame, when an angular velocity is less than an angular velocity threshold. Further, the image capture control circuit activates, during the frame and in response to identifying that the angular velocity is less than the angular velocity threshold, exposure of the image capture system to illumination for at least one of: at least a minimum integration period of time during the frame, and while the angular velocity is less than the angular velocity threshold during the frame.

It has been identified that vibrations and other jitter (e.g., caused by a moving platform (e.g., a moving vehicle) in which an imaging system is mounted, weather conditions affecting a stationary or mobile platform with which an imaging system is secured, etc.) can drastically affect the resolution and clarity of images captured by such imaging systems. Many low mass imaging systems exhibit enhanced platform vibration coupling. Many previous motion correction techniques with image capture systems fail to provide adequate correction in part due to limits in predicting semi-chaotic motion with sufficient precision to effectively implement mechanical corrective actions. Further, as integration times of an imaging system increase to capture an image, the angular displacement jitter that the imaging system is subjected to during that integration time increases. Although the signal to noise ratio may increase as the integration or frame period increases, the angular displacement of the imaging system caused by vibration and jitter can often make resulting images unusable for many applications and/or intended uses of the captured images. Conversely, however, as integration times are reduced, the signal to noise ratio typically rapidly reduces resulting in images that are often also unusable for many intended purposes. Similarly, many imaging systems have a limited link budget regarding the amount or intensity of illumination that can be emitted by one or more light sources (e.g., based on power limits, heat, operating parameters of the light source, safety, stealth, secrecy, etc.) that can significantly affect the signal to noise ratio over a given period of time (e.g., frame rate).

In some embodiments, imaging systems mounted in vehicles and other moving platforms that are subject to vibration and/or movement include mechanical stabilization systems (e.g., motors, etc.) that can apply mechanical techniques to attempt to compensate for at least some movement of the imaging system. Such mechanical stabilization systems, however, typically have relatively slow reaction times (e.g., about 100-500 Hz) relative to the frequencies of vibrations and other such jitter, which are often thousands of Hz. Accordingly, mechanical stabilization systems are ineffective in providing sufficient compensation and/or stabilization to address angular displacements of the imaging system as a result of at least some vibrations and other such jitter. Some embodiments apply post image processing techniques that attempt to improve image quality of captured images. Such post image processing techniques are also often ineffective in compensating for the degradation of images caused by angular displacement of the imaging system as a result of vibrations and other such jitter.

FIG. 1 illustrates a simplified block diagram of an exemplary enhanced resolution imaging system 100, in accordance with some embodiments. The imaging system 100 monitors angular velocity causing angular displacement and controls the exposure of an image capture system 108 to light and/or various integration gains of one or more focal plane arrays. This control, in part, limits angular blur by controlling an exposure level and/or inhibiting integration of signals of a frame when there is angular velocity that is outside of one or more thresholds. In some embodiments, the imaging system 100 includes at least one image capture control circuit 106 that is communicatively coupled, over one or more communication links and/or networks 114, with at least one electro-optical image capture system 108, and one or more sensor systems 110. Some embodiments optionally further include at least one illumination source system 112. The imaging system 100 typically includes and/or is secured with a mounting 102 that is configured to secure with a bench and/or a body 104 of a platform, which may be a stationary platform or may be a platform that moves. In some implementations, the imaging system 100 is configured to be mounted in or on a moving vehicle and the platform is part of and/or secured with the vehicle. For example, in some instances, the imaging system 100 may be secured with a frame, beam, chassis, fuselage, or other part of an aerial vehicle, a ground based vehicle, a water based vehicle, or other relevant vehicle. In some instances, the vehicle may be an unmanned vehicle that autonomously or semi-autonomously controls movement of the vehicle based on one or more travel paths (e.g., flight path). Similarly, the vehicle may be an unmanned vehicle that is at least partially remotely controlled from a remote location of tens of feet to thousands of miles or more. The imaging system 100 may additionally or alternatively be utilized with other platforms that are subject to movement and/or other effects that can cause jitter. Still further, the imaging system 100 may be used on fixed location and/or stationary mountings, and/or while a vehicle is stopped and at least temporarily in a fixed location.

In some implementations, the mounting 102 includes movable components that allow at least part of the mounting to move relative to the body of the platform. The body may include a frame, one or more support structures, joists, beams, formers, stringers, ribs, chassis, fuselage, body, skin, or the like, and the mounting 102 may be secured with one or more of such structures of the platform or vehicle. The mounting 102 may include or may be a turret system, gimbal system, or other such system that can be cooperated with a stationary platform or moving platform, such as a moving vehicle and secure the imaging system 100 relative to the vehicle. Further, the mounting may enable movement of the imaging system 100 to position the imaging system along a desired line of sight. As such, the mounting 102 may include or be cooperated with one or more motors mechanically cooperated to move at least the image capture system 108.

In some implementations, the image capture control circuit 106 communicatively couples with the one or more motors to control the one or more motors of the mounting 102. In other embodiments, the mounting 102 includes one or more motor control circuits that control the one or more motors of the mounting 102. The motor control circuits may be communicatively coupled with the image capture control circuit 106 to receive at least some instructions to control the directional orientation of at least the image capture system 108 and/or the line of sight of the image capture system 108.

In some embodiments, the image capture control circuit 106 is implemented at least in part through one or more processors, microprocessors, application specific integrated circuit (ASIC), micro-controller, other such control circuitry, or combination of two or more of such control circuitry. Some embodiments further include one or more location determination systems 130 that are configured to determine a location and/or orientation of at least the image capture system 108. The location and/or orientation information can be communicated to the image capture control circuit 106 over the one or more communication connections and/or networks 114. The location information, in some implementations, can include global positioning satellite (GPS) location information, accelerometer information, gyroscope information, distance information, other relevant information, and typically a combination of two or more of such information. In some embodiments, some or all of the location determination systems 130 may be part of a location system of the vehicle in which the imaging system 100 is positioned, while in other implementations the location determination system 130 is separate from the vehicle location system.

The image capture system 108 is cooperated with the mounting 102. For example, the image capture system 108 may be fixed relative to the mounting system and can be positioned or moved into position with a line of sight of the image capture system 108 that is directed out of the vehicle. One or more optics 124, 125 (e.g., lens, windows, prisms, filters, etc.) may be part of and/or positioned relative to the image capture system 108 and/or the illumination source system 112. In some embodiments, the image capture system 108 is a digital image capture system, camera or the like with an array of pixel sensors and/or light sensors (e.g., CMOS sensors, CCD sensors, etc.). Further, in some implementations, the image capture system is configured to capture images at relatively long ranges, including images from an aerial vehicle flying at heights of 30,000 ft. above the ground and/or the object of interest and higher, while capturing images with resolutions sufficient to perform accurate facial recognition of one or more persons within one or more images captured by the image capture system. Accordingly, the imaging system 100 provides enhanced resolution images for substantially any imaging when jitter and/or vibration can otherwise reduce the image quality and/or resolution.

It has been identified that line of sight jitter reduces image resolution by, for example, imprinting angular blur on images as the image sensors of the image capture system 108 move during exposure integration. As described above, some approaches to address this image degradation issue have attempted to physically counteract or minimize the motion and apply post processing techniques. Some systems attempt to predict motion. However, often such imaging systems exhibit enhanced platform vibration coupling and the success of physical motion correction techniques have been limited based on ineffective predicting of semi-chaotic motion with high precision and the frequency of the angular displacement, and/or mechanical systems not being capable of responding fast enough or accurately enough to effectively cancel out the motion or jitter.

In some embodiments, the one or more sensor systems 110 are configured to detect angular jitter noise, velocity, movement, tilt, rotation, and/or other such movement relative to the image capture system 108 that may alter and/or cause line of sight angular displacement of the image capture system 108 relative to a target being captured in images by the image capture system. At least one sensor system 110 is secured with the mounting 102, body 104, and/or the image capture system 108. The one or more sensor systems 110 may include one or more gyroscopes, accelerometers, inertial sensors, inertial measurement units (IMU) that is configured to detect and report one or more of a body's specific force, angular rate, sometimes the orientation of the body and other such factors (e.g., using one or more of or a combination of accelerometers, gyroscopes, sometimes magnetometers, GPS, etc.), other such sensor systems, or combination of two or more of such sensor systems. Some embodiments utilize multiple different sensor systems to detect one or more of vibration, velocity, acceleration, angular displacement in one of multiple different directions or axes of movement, other such parameters, and typically a combination of two or more of such parameters determined based on sensor data from one or more different sensor systems. Some sensor systems may additionally or alternatively be used to detect velocity, acceleration, vibration and/or angular displacement in multiple directions or along multiple axes. In some embodiments, the one or more sensor systems 110 includes at least an angular velocity sensor system 111 that comprises at least one gyroscope. The sensor system 110 and/or the image capture control circuit 106 is configured to integrate gyroscope data received from the one or more gyroscopes and used to obtain time-dependent angular position and/or angular velocity of the line of sight of the image capture system over each frame.

The illumination source system 112, when included in the imaging system 100, is further positioned relative to the image capture system 108 to emit illumination that is reflected by the remote target (and often surrounding area) being imaged, and subsequently detected by the image capture system 108. In some embodiments, the illumination source system 112 is cooperated with the mounting 102 in alignment with the line of sight of the image capture system 108. The illumination source system 112 can include one or more laser systems (e.g., infrared, ultraviolet, other such lasers), other light source or combination of two or more of such illumination sources.

The image capture control circuit 106 is communicatively coupled with one or more image capture systems 108, the one or more movement and/or jitter sensor systems 110, and in some embodiments communicatively couples with the illumination source system 112 when included. Some implementations optionally include one or more mechanical stabilization control circuits 116 coupled with and controlling one or more motors 120 to implement movement of the mounting 102, image capture system 108, illumination source system 112, and/or other structure. Additionally or alternatively, the image capture control circuit 106 controls the one or more motors 120. The mechanical stabilization control circuit 116 and/or image capture control circuit 106 may further be configured to control the one or more motors 120 to control a direction of the field of view of the image capture system 108. In some applications, the mechanical stabilization control circuit 116 communicatively couples with the image capture control circuit 106 to receive instructions from the image capture control circuit, provide information to the image capture control circuit, and/or provide instructions to the image capture control circuit.

The one or more motors 120, when activated, implement movement of the mounting 102, image capture system 108 and/or other structures. In some instances, the image capture control circuit 106 is communicatively coupled with one or more motors 120, and/or some or all of the mechanical stabilization control circuit 116 may be implemented through the image capture control circuit 106. In some embodiments, one or more motors of the vehicle can be utilized to provide least some mechanical stabilization and/or imaging system line of sight orientation. Other embodiments are implemented without the one or more motors 120 and/or mechanical stabilization control circuit 116 used in controlling movement of the mounting. Such embodiments, in some applications, control line of sight of the image capture system 108 and/or provide at least some mechanical stabilization through control of one or more motors of the vehicle that control movement of the vehicle. In some embodiments, for example, the imaging system 100 is implemented in an unmanned aerial vehicle, and control of one or more motors driving propellers that provide lift and/or movement for the unmanned vehicle are controlled in part to provide some mechanical pointing of the imaging system and/or stabilization.

The image capture control circuit 106 can activate the image capture system 108 to capture one or more images, and in some instances to capture video content comprising a series of frames. The frame rate at which the image capture system 108 operates can be 24 frames per second, in some instances at least 30 frames per second, and in some instances greater than 30 frames per second. Additionally, one or more other image capture systems 108 may cooperatively operate to capture additional frames. Still further, the image capture control circuit 106 can, in some applications, control the illumination source system 112 based in part on the frame rate. In some embodiments, the image capture control circuit 106 further controls one or both of the image capture system 108 and the illumination source system 112 based on the sensor data received from the one or more sensor systems 110.

The image capture control circuit 106 is configured to receive sensor data from the one or more sensor systems 110, such as acceleration data, velocity data, line of sight angular displacement data, other such sensor data or a combination of two or more of such sensor data from one or more the sensor systems 110. Typically, the sensor data is received in substantially real-time. Accordingly, as the sensor data is captured and/or processed, the sensor data and/or processed sensor data is communicated to the image capture control circuit 106. Further, the sensor data is typically received at the image capture control circuit 106 just prior to and/or during each frame being captured by the image capture system 108.

Figure 2:
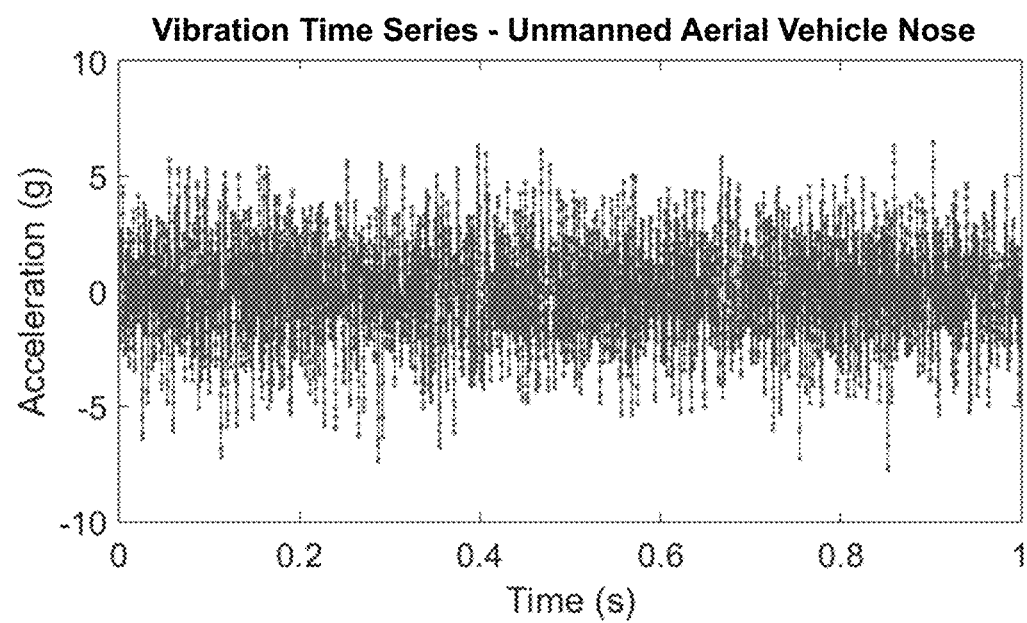
FIG. 2 illustrates a simplified graphical representation of an exemplary vibration profile for a turret system in a vehicle showing vibration sensor data versus time that may affect an image capture system while attempting to capture images as a vehicle is moving, in accordance with some embodiments.
Figure 3:
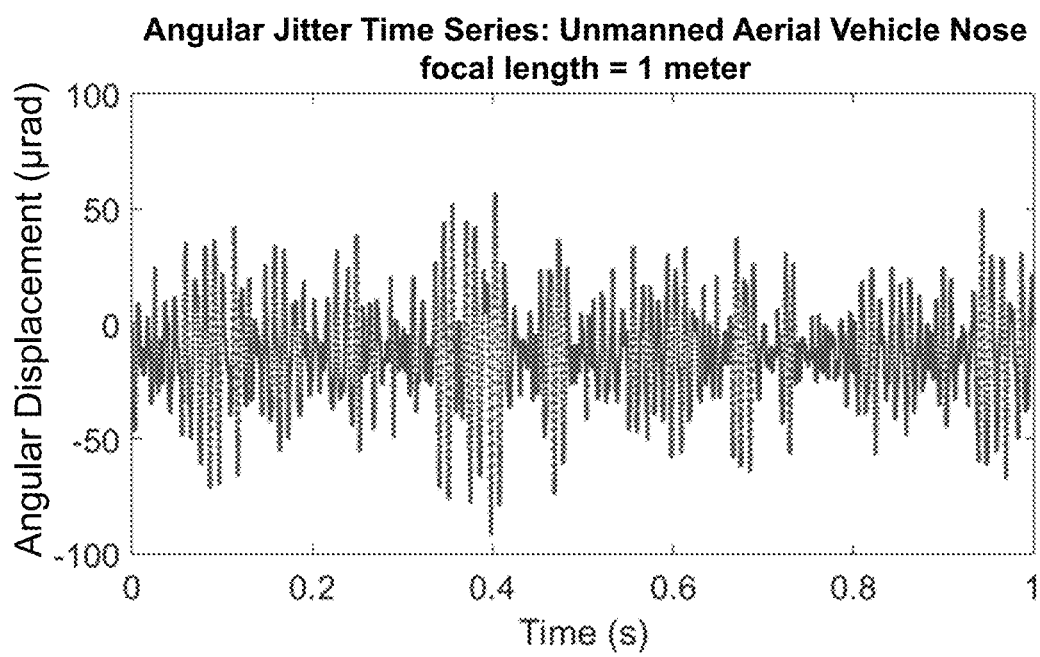
FIG. 3 illustrates a simplified graphical representation of exemplary angular jitter sensor data versus time that may affect an image capture system while attempting to capture images as a vehicle is moving, in accordance with some embodiments.
Figure 4:
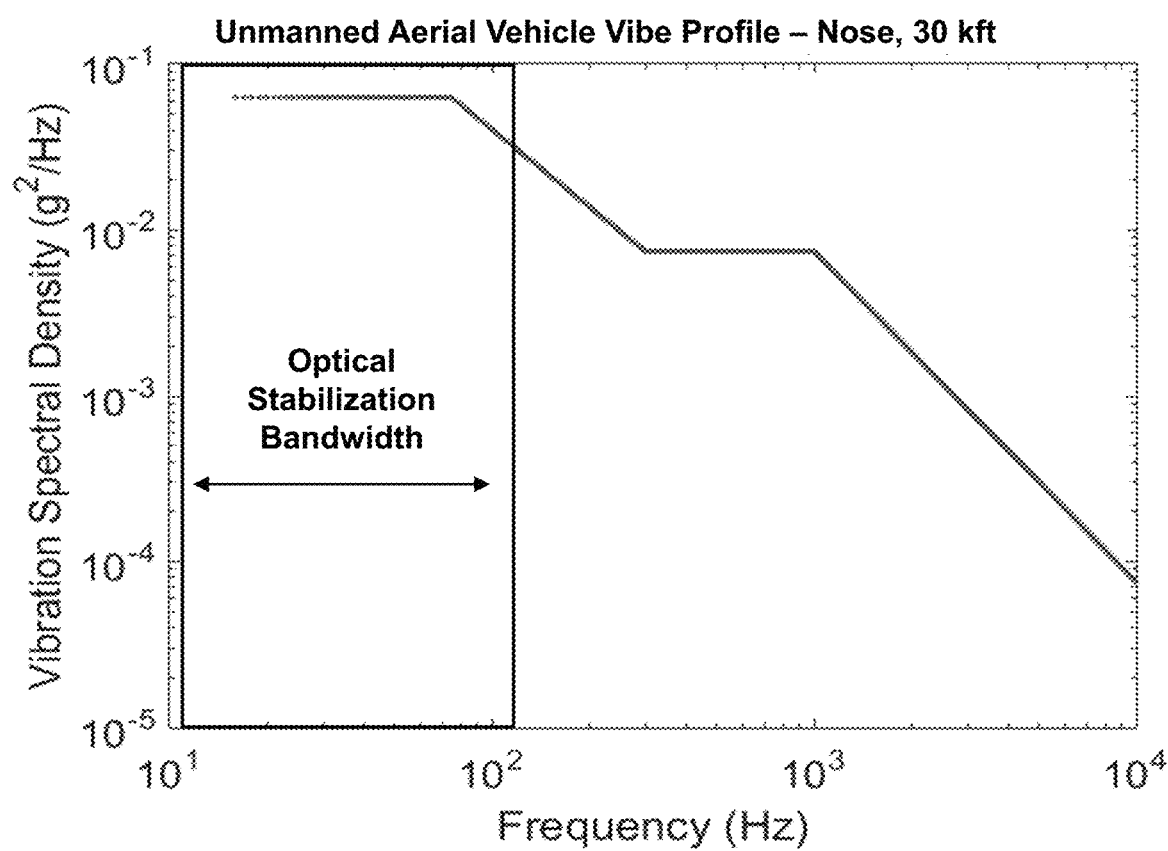
FIG. 4 illustrates a simplified graphical representation of a vibration power spectrum density for an exemplary movable platform, in accordance with some embodiments.

FIG. 2 illustrates a simplified graphical representation of an exemplary vibration profile for a turret system in a vehicle showing vibration sensor data versus time that may affect an image capture system 108 while attempting to capture images as a vehicle, with which the imaging system 100 is cooperated, is moving, in accordance with some embodiments. The exemplary graphical representation shows acceleration (g) versus time caused by jitter and/or vibrations in a platform (e.g., a small unmanned aerial vehicle (SUAV)). FIG. 3 illustrates a simplified graphical representation of exemplary angular jitter sensor data versus time that may affect an image capture system 108 while attempting to capture images as a vehicle, with which the imaging system 100 is cooperated, is moving (in this example corresponding to about 20-30 microradians of line of sight jitter), in accordance with some embodiments. As illustrated, the displacement of the image capture system 108 can fluctuate at relatively high frequencies (e.g., greater than 100 Hz, and often greater than 1000 Hz). In some applications, the imaging system 100 may attempt to compensate for some lower frequencies of noise and/or displacement through mechanical stabilization mechanisms (e.g., the motor 120 and mechanical stabilization control circuit 116) and/or image processing. FIG. 4 illustrates a simplified graphical representation of a vibration power spectrum density for an exemplary movable platform (e.g., a small unmanned aerial vehicle (SUAV)), in accordance with some embodiments. The exemplary vibration power spectral density ($g^2$/Hz) is graphically shown versus frequency distribution.

Again, in some embodiments, the imaging system 100 may employ one or more mechanical stabilization techniques in attempts to limit or prevent some of the lower frequency angular displacements caused by lower frequency vibrations. Such mechanical compensations are typically limited to mitigate and/or provide compensation for displacement frequencies that are less than about 500 Hz, and often less than 100 Hz. In some embodiments, the image capture control circuit 106 additionally or alternatively applies one or more angular velocity thresholds relative to angular movement and/or displacement in controlling exposure of and/or when to expose the image capture system 108 to illumination reflected from and/or generated from the target or subject for which an image is being taken. Some implementations control exposure relative to angular velocity and/or displacement frequency to aid in limiting image degradation from vibration and jitter that cause angular displacement of the image capture system 108 at the lower frequencies (e.g., below 100 Hz) as well as higher frequencies (e.g., greater than 100 Hz) of vibration and/or jitter. The illumination can be from one or more passive illumination sources that are sources external to the imaging system 100 (e.g., sun, moon, street light, vehicle light, laser light, and/or other such external sources of illumination emitted from or reflected from the target for which an image is being taken), can be from other passive illumination, such as but not limited to illumination emitted by the target of interest (e.g., emitting energy radiation (e.g., infrared, thermal, visible, etc.)), can be active illumination emitted by the controlled illumination source system 112 to impinge upon and at least some of the illumination be reflected by the target, and/or a combination of two or more illumination sources.

In some embodiments, the image capture control circuit 106 determines an angular velocity of the image capture system 108 and/or the line of sight of the image capture system 108. Typically, the image capture control circuit 106 determines the angular velocity prior to and during each frame time during which the image capture system 108 can be activated to capture a frame of the series of frames. Further, in some implementations, the image capture control circuit 106 continuously determines and monitors the angular velocity of the image capture system 108 and/or line of sight of the image capture system while images are captured. The angular velocity evaluation can, in some embodiments, be limited based on sensor data corresponding to frequencies greater than a predefined frequency threshold, such as frequencies that are greater than the frame rate, greater than a minimum integration period of time, other such frequency thresholds or a combination of two or more of such thresholds. Further, in some embodiments, the image capture control circuit 106 monitors when the detected velocity of the image capture system 108 and/or mounting 102, based on the sensor data from the one or more sensor systems 110, is within one or more velocity thresholds. For each frame, the image capture system 108 can be activated for a respective integration period when the angular velocity is below or within one or more thresholds.

Some embodiments compensate for angular displacement of an imaging system caused by jitter through the detection of angular velocity of the mounting and/or line of sight of the image capture system 108, controls an exposure to the image capture system based on the detected angular velocity. Still referring to FIG. 1, some embodiments provide resolution imaging systems that mount on an aerial vehicle or other vehicle an enable the capture of a series of images having improved resolution and/or clarity that previous systems exposed to similar jitter conditions. The imaging system 100 includes the mounting 102 that is configured to secure with the vehicle. One or more electro-optical image capture systems 108 are further cooperated with the mounting 102, and are each configured to sequentially obtain a series of frames per second. The frame rate of an image capture system 108 can depend on one or more factors, but are typically greater than 20 frames per second, and may be greater than 60 frames per second.

The imaging system 100 further includes at least one jitter compensation system that provides a first technique of angular displacement mitigation to mitigate an effect of line of sight (LOS) angular displacement of the image capture system 108 resulting from jitter, vibrations and the like. The sensor system 110 includes one or more angular velocity sensor systems cooperated with the mounting 102. The angular velocity sensors system is configured to detect a velocity of change of the LOS angular displacement of the image capture system 108 caused by angular jitter noise. Some embodiments include one or more illumination source systems 112 cooperated with the mounting 102. The illumination source system 112 typically includes one or more laser systems (e.g., infrared, ultraviolet, other such lasers), or other light source.

The one or more image capture control circuits 106 are included in the imaging system 100. The image capture control circuit is communicatively coupled with the one or more sensor systems 110, the illumination source system 112 and the image capture system 108. Prior to and/or during each frame of the series of frames the image capture control circuit 106 is configured to receive, in real-time, angular velocity data from the one or more sensor systems 110 (e.g., one or more gyroscopes, one or more accelerometers, one or more angular velocity sensor systems 111, other such sensor systems or a combination of such sensor systems). Based on the velocity sensor data, the image capture control circuit 106 identifies, in real-time prior to and/or during the frame, when an angular velocity is less than an angular velocity threshold, and activates, during the frame and in response to identifying that the angular velocity is less than the angular velocity threshold, exposure of the image capture system 108 to passive and/or active illumination and causes the image capture system 108 to capture an image. The passive illumination can include illumination from that sun, the moon, external light sources unassociated with and/or not controlled by the imaging system 100 (e.g., street lights, light from dwellings, light from a vehicle, etc.), light emitted by the target or subject (e.g., natural IR self-illumination, headlights, laser, etc.), other sources of light, or a combination of two or more of such illumination sources. In active mode, an illumination source system 112 is controlled to emit light as the light source. Further, in some embodiments, the active illumination source system 112 can be controlled to turn on and off, which may be timed to correspond with and/or be in conjunction with the integration times of the image capture system 108. Further, the illumination, whether active and/or passive, is not limited to visible light, but can be illumination in one or more frequency bands for which the image capture system 108 is configured to capture, including one or more visible frequency bands, infrared frequency bands, other such frequency bands, or a combination of two or more of such frequency bands.

Accordingly, some embodiments are configured to be used in one or both of active and passive conditions. The active mode, in some implementations, additionally utilizes external sources of illumination. In a passive mode, the imaging system takes advantage of one or more external sources of illumination (e.g., sun, moon, vehicle lights, lasers, other radiation source external to imaging system 100 and/or a vehicle (e.g., an aircraft)) that provide the illumination. In some embodiments, the image capture system 108 utilizes a variable integration time and integration starting location as inputs into the image capture system software. The sensor systems 110, in some embodiments, include one or more light sensors (e.g., visible light sensors, IR sensors, MWIR sensors, other such sensors or a combination of two or more of such sensors) to detect a level of illumination at the imaging system 100 from one or more external sources and/or the controlled illumination source system 112. Some embodiments further control the gain of the one or more light sensors, which may correspond to the control of a gain of the image capture system 108.

In some embodiments, the image capture control circuit 106 controls the image capture system 108 to control an integration time of the image capture system. The image capture control circuit 106, in some implementations, controls the image capture system 108 to integrate for at least a minimum integration period of time during the frame. Additionally or alternatively, the image capture control circuit 106 controls the image capture system to integrate while the sensed angular velocity is less than an angular velocity threshold during the frame being captured. The capture of subsequent frames can similarly be controlled to integrate for at least the minimum integration period of time during the frame and/or while the sensed angular velocity during the frame continues to be less than an angular velocity threshold. Some embodiment, when applying an active illumination further activate the illumination source system to emit at least some of the illumination for at least the minimum integration period of time during the frame.

Figure 5:
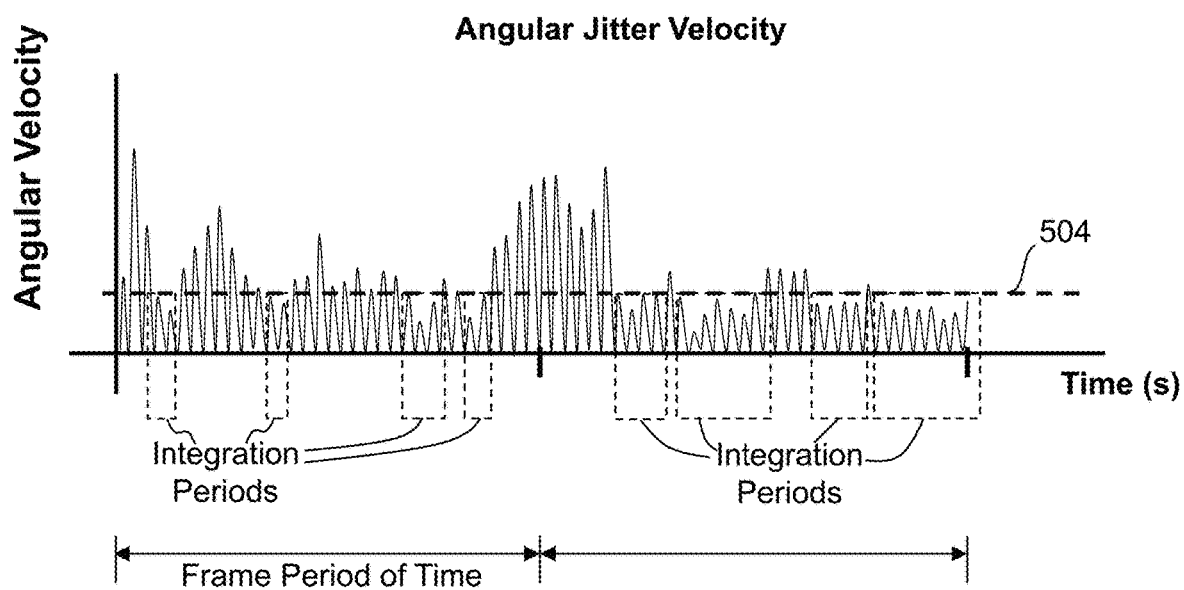
FIG. 5 illustrates a simplified graphical representation of exemplary angular velocity versus time based on sensor data, in accordance with some embodiments.
Figure 6:
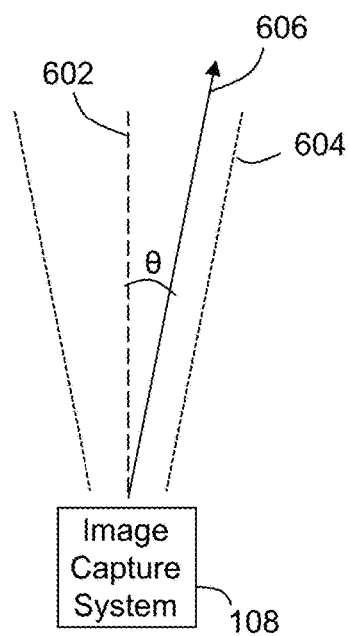
FIG. 6 illustrates a simplified block diagram of an exemplary intended line of sight within an exemplary intended field of view of an exemplary image capture system, and an angular change of an actual line of sight of the image capture system in response to jitter and/or vibration, in accordance with some embodiments.

FIG. 5 illustrates a simplified graphical representation of exemplary angular velocity versus time based on sensor data, in accordance with some embodiments. FIG. 6 illustrates a simplified block diagram of an exemplary intended line of sight 602 within an exemplary intended field of view 604 of an exemplary image capture system 108, and an angular change θ of an actual line of sight 606 of the image capture system 108 in response to jitter and/or vibration, in accordance with some embodiments. Referring to FIGS. 5-6, the velocity of angular displacement (i.e., rate of change of an angle θ (Δθ) between a desired or intended line of sight 602, and the actual line of sight 606 resulting from jitter, vibration and/or other factors) can have a significant adverse effect on the resolution, blurring and/or clarity of images captured by an image capture system 108. Accordingly, some embodiments apply one or more angular velocity thresholds 504 and limit the activation of the integration by the image capture system during a frame to when the angular velocity of the image capture system 108, mounting 102 and/or the line of sight 606 of the image capture system is less than the angular velocity threshold 504.

In some embodiments, the integration period of a frame is set to at least a minimum duration or period of time of that frame. This minimum integration period of time can be a fixed time, may be defined based on parameters and/or characteristics of the imaging system 100 and/or environmental conditions, and/or may be changed or variable prior to and/or between different frames. Accordingly, the image capture control circuit 106, in some embodiments, is configured to continue to control and/or activate the exposure of the image capture system 108 during a particular frame for at least the minimum integration period of time. Additionally, the integration period may, in some instances, be extended beyond the minimum integration period of time based on one or more factors. As such, the angular velocity, an end of a frame period, a threshold exposure level, an angular displacement of the image capture system and/or the LOS angular displacement beyond one or more angular displacement thresholds and/or angular displacement threshold envelope, other such factors, or a combination of two or more of such factors. In some embodiments, the image capture control circuit 106 is configured to continue to activate the exposure of the image capture system 108 during a particular frame and while the angular velocity continues to be less than the angular velocity threshold, and to terminate the exposure of the image capture system 108 to the illumination, following the minimum integration period of time, in response to detecting, based on the angular velocity data, the angular velocity exceeding the angular velocity threshold, a frame duration of time of the frame expires, other such conditions, or a combination of two or more of such conditions.

Figure 7:
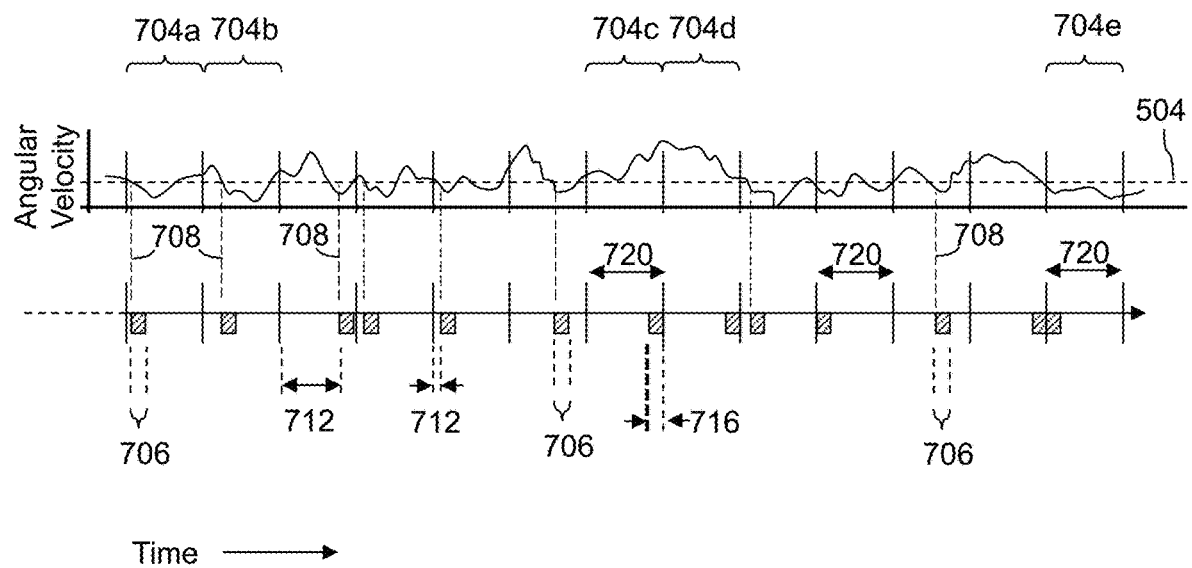
FIG. 7 illustrates a simplified graphical representation of exemplary angular velocity of a change in the line of sight of the image capture system versus time over a series of frames, and corresponding exemplary integration periods of time by the image capture system, in accordance with some embodiments.

FIG. 7 illustrates a simplified graphical representation of angular velocity of a change in the line of sight of the image capture system versus time over a series of frames 704, and corresponding integration periods of time 706 by the image capture system 108 as controlled by the image capture control circuit 106, in accordance with some embodiments. In some embodiments, the image capture control circuit 106 evaluates the sensor data and identifies just prior to and/or during a frame 704 if and when the angular velocity of a change in the line of sight of the image capture system 108 is equal to or drops below 708 at least one angular velocity threshold 504. In response to the angular velocity having the predefined relationship with the angular velocity threshold 504, the image capture control circuit 106 activates the image capture system 108 to initiate integration. Further, in some embodiments, the image capture system 108 is controlled to integrate for a set integration period of time 706 for each frame. This set integration period of time 706 is defined, in some embodiments, as a minimum integration period of time, and each frame has the same integration. Accordingly, there may be a different wait duration 712 during different frames prior to the activation of integration based on the sensed angular velocity, while in other frames the integration activation may occur substantially at the start of the frame without any wait duration.

Further, in some embodiments, the image capture control circuit 106 activates the image capture system 108 to capture an image in each frame. As such, in some instances, the image capture control circuit 106 may activate the image capture system 108 even when the angular velocity is not below the angular velocity threshold 504 so that an image is captured during a frame regardless of the angular velocity. In some embodiments, the image capture control circuit 106 detects, during a single frame, that a minimum threshold amount of time 716 remains of the frame duration of time 720 (i.e., the duration of time of each frame, such as a frame duration of time of approximately 0.0333 seconds, when the frame rate is 30 frames per second). Further, the image capture control circuit 106 can identify or detect that the exposure of the image capture system 108 has not yet been activated during the subject frame resulting from the angular velocity not having dropped below the angular velocity threshold during the frame. During the frame and in response to detecting that the minimum threshold amount of time 716 remains and the exposure of the image capture system has not been activated during the frame, the image capture control circuit 106 further activates the exposure of the image capture system for at least the minimum integration period of time 706 during the particular frame to capture an image. In some embodiments, images captured in response to a detection of the minimum threshold amount of time 716 remaining in the frame may be discarded, tagged or otherwise labeled, or other actions taken so that the image is not used or is used with knowledge that the image likely has a resolution and/or clarity below one or more desired thresholds.

Again, in some embodiments, the integration may be implemented for a fixed integration period of time for each frame of a series of frames. In other embodiments, however, the integration period of time or duration is variable and can be different for different frames of a series of frames.

Figure 8:
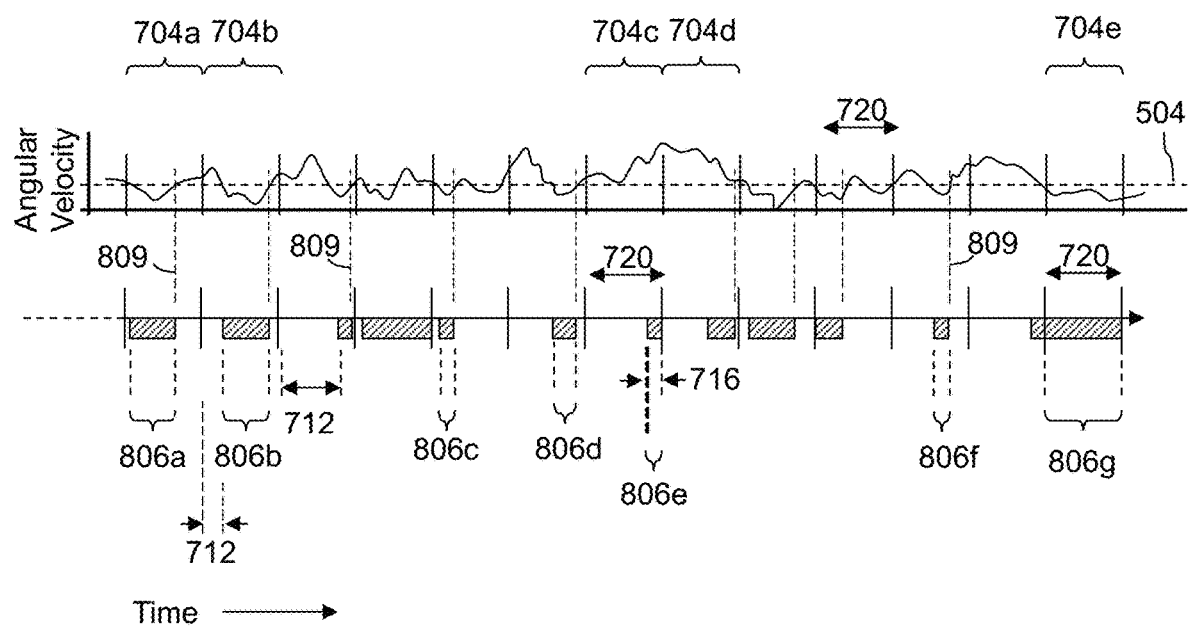
FIG. 8 illustrates a simplified graphical representation of exemplary angular velocity of a change in the line of sight of the image capture system versus time over a series of frames, and corresponding exemplary variable integration periods of time by the image capture system, in accordance with some embodiments.

FIG. 8 illustrates a simplified graphical representation of angular velocity of a change in the line of sight of the image capture system versus time over a series of frames 704, and corresponding exemplary variable integration periods of time 806*a*-*g* by the image capture system 108 as controlled by the image capture control circuit 106, in accordance with some embodiments. In some embodiments, the image capture control circuit 106 evaluates the sensor data and identifies just prior to and/or during a frame 704 if and when the angular velocity of a change in the line of sight of the image capture system 108 is equal to or drops below at least one angular velocity threshold 504. In response to the angular velocity having the predefined relationship with the angular velocity threshold 504, the image capture control circuit 106 activates the image capture system 108 to initiate integration. Again, different frames may have different wait durations 712 prior to the activation of integration based on the sensed angular velocity, while in other frames the integration activation may occur substantially at the start of the frame without any wait duration, which may include no wait (e.g., activating at the start of the frame period 720).

Further, in some embodiments, the image capture control circuit 106 controls the image capture system 108 to implement a variable integration period of time 806 as a function of the sensed angular velocity relative to the predefined relationship with the angular velocity threshold 504. As such, the integration period of time 806 can be extended and the integration by the image capture system 108 continues while the angular velocity of a change in the line of sight of the image capture system continues to be below the angular velocity threshold 504. In the illustrated example in FIG. 8, the integration period of time 806*a* of one frame is different (e.g., greater) than the integration period of time 806*c* in another one of the frames of the set of frames. In some instances, the integration period of time may be substantially the same or the same duration as a frame duration of time 720, when the integration is activated at the start of the frame and the angular velocity remains below the angular velocity threshold 504.

As such, in some embodiments, the image capture control circuit 106 is configured to continue to activate the exposure of the image capture system 108, and/or not deactivate the exposure of the image capture system 108, during the frame and while the angular velocity continues to be less than the angular velocity threshold. Further, the image capture control circuit 106 is configured to terminate the exposure of the image capture system 108 to the illumination in response to detecting, based on the angular velocity data, that the angular velocity has exceeded 809 the angular velocity threshold 504. Further, the image capture control circuit 106 terminate the exposure of the image capture system 108 in response to a frame duration 720 of time of the frame expiring and/or terminates a frame, and initiates integration for a subsequent frame when the angular velocity continues to remain below the angular velocity threshold.

In some embodiments, the image capture control circuit does not terminate the integration by the image capture system 108 for a frame once integration is activated until at least the minimum integration period of time has expired and/or a frame period 720 ends. Accordingly, in some embodiments, once integration is activated based on angular velocity being below the angular velocity threshold, integration continues for at least the minimum integration period of time 806c, 806e, and the image capture control circuit terminates the exposure of the image capture system 108 at the least following the minimum integration period of time when at the end of the minimum integration period of time the angular velocity exceeds 809 the angular velocity threshold and/or at the end of a frame duration 720. Accordingly, in some embodiments, the image capture system 108 is activated for at least the minimum integration period of time (e.g., 806c, 806e) during each frame duration 720. As described above, the image capture control circuit 106, in some embodiments, detects during a single frame that a minimum threshold amount of time 716 remains of the frame duration of time 720, and regardless of whether the angular velocity is less than the threshold 504 activates the image capture system 108 for at least the minimum integration period 806e. This activation is typically terminated at the end of the frame duration 720.

Some embodiments further repeatedly activate and deactivate the exposure of the image capture system 108 and/or integration by the image capture system 108 multiple times during a single frame based at least in part on the sensed angular velocity relative to one or more angular velocity thresholds 504. The repeated integrations during a single frame are cooperatively utilized in capturing the image. The multiple integration periods of time during a single frame provides an increased exposure that typically results in an increased signal to noise ratio.

Figure 9:
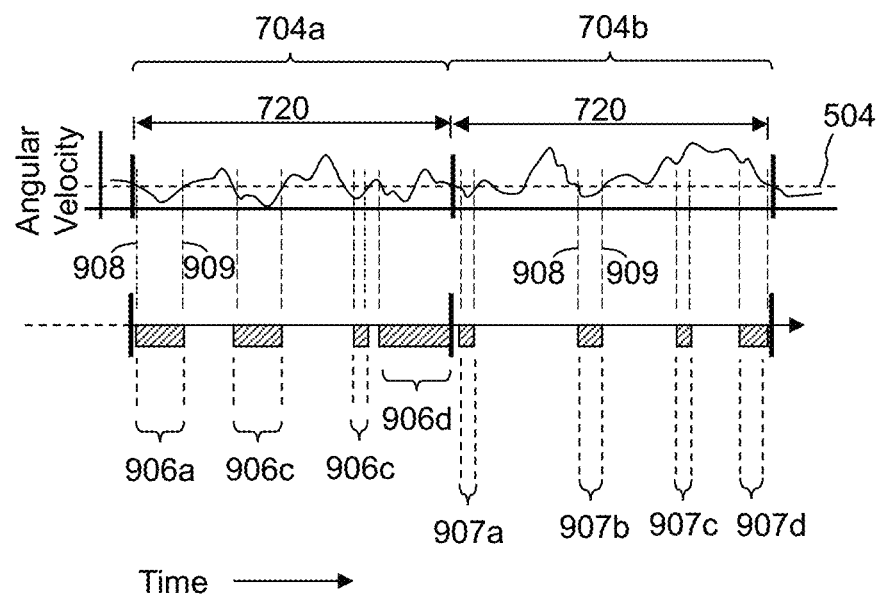
FIG. 9 illustrates a simplified graphical representation of exemplary angular velocity of a change in the line of sight of the image capture system versus time over a series of multiple frames, and corresponding exemplary variable integration periods of time by the image capture system, in accordance with some embodiments.

FIG. 9 illustrates a simplified graphical representation of angular velocity of a change in the line of sight of the image capture system versus time over a series of multiple frames 704a-b, and corresponding exemplary variable integration periods of time 906a-d and 907a-d by the image capture system 108 as controlled by the image capture control circuit 106, in accordance with some embodiments. The image capture control circuit 106 is configured to repeatedly, during a single frame (e.g., frame 704a), activate 908 and deactivate 909 the exposure of the image capture system 108 to illumination in response to the detected angular velocity transitioning to less than an angular velocity threshold 504 and transitioning to greater than the same or a different angular velocity threshold 504 resulting in one or more integration periods of time 906a-d, 907a-d during a single frame.

In some embodiments, the image capture control circuit in controlling the exposure of the imaging system is configured to control the illumination source system 112 based on detected angular velocity of the imaging system relative to the one or more angular velocity thresholds, and control or adjust the exposure of the image capture system 108 to illumination from the illumination source system 112 and reflected from the target as a function of the detected angular velocity. Still further, the image capture control circuit 106 can, in some applications, control the illumination source system 112 based in part on the frame rate. In some embodiments, the image capture control circuit 106 in activating the exposure of the image capture system 108 is configured to activate the illumination source system 112 to emit at least some of the illumination for at least some of the integration period of time during the frame. Such control can include activating the illumination source system 112, during the capture frame, to emit illumination along the line of sight and/or such that the illumination impinges upon a focal point of the image capture system 108 when the detected angular velocity of the image capture system 108 is within the angular velocity threshold 504.

The activation of the illumination source system 112, in some implementations, causes the illumination source system to emit illumination along the line of sight. Further, the image capture control circuit 106 in controlling exposure can deactivate the illumination source system at an end of an integration period of a frame, at an end of a frame and/or other instances in capturing a frame. Additionally or alternatively, in some embodiments, the image capture control circuit gradually decreases the intensity of the illumination or illumination strength from the illumination source as the detected angular velocity increases toward and/or beyond one or more angular velocity thresholds 504, and/or may gradually increase the intensity of the illumination or illuminator strength as the detected angular velocity decreases relative to and/or is within one or more angular velocity thresholds 504. The gradual increased and decreased exposure may be implemented in an analog fashion, in a binary to multiple thresholds fashion, or other such gradual change in levels of exposure. The rate of increase or decrease may be a function of the detected angular velocity, a rate of change of the angular velocity and/or other such factors. Typically, the rate factor or the applied rate of change of exposure, when applying a non-binary or analog adjustment, is dependent on the detected angular velocity.

Again, some embodiments implement a binary exposure to activate exposure and prevent exposure (e.g., by controlling the image capture system 108 and/or one or more illumination source systems 112), while other embodiments provide an analog adjustment of the exposure level based on detected angular velocity. Such embodiments that apply an analog adjustment may smoothly or through steps adjust the level of exposure (e.g., decrease smoothly (analog) as the angular velocity increases). In some implementations, for example, the rate of increase or decrease is proportional to the angular velocity relative to a zero velocity, other reference, other threshold and/or multiple thresholds. In some applications, the rate of decrease and increase may be applied symmetrically, while in other embodiments, the rate of increase and/or decrease may similarly be dependent on the detected level of angular velocity relative to one or more thresholds. Further, in some instances the smooth rate of change may reach a threshold that results in exposure being prevented for a period of time, and as velocity decreases the level of exposure can be gradually increased. In some embodiments, the image capture control circuit 106 fluctuates the illumination intensity along the line of sight from the illumination source system 112 one or more times per frame. A gradual increase or decrease can, in some implementations, be applied depending at least partially on a detected vibration profile of the platform (e.g., Gaussian profiles). Further, in some instances, the image control circuit may activate and deactivate the illumination source system 112 one or more times per frame in addition to gradually decreasing and increasing exposure during one or more of those same frames.

In some implementations, the image capture control circuit 106 activates the illumination source system 112 to generate illumination, and deactivates the illumination source system to stop generating illumination based on the detected sensor data and the angular velocity of a change in line of sight the image capture system 108 relative to the angular velocity threshold 504. Accordingly, in some embodiments, the image capture control circuit 106 activates and deactivates the illumination source system 112 one or more times per frame corresponding to the one or more integration periods of time 706, 806, 906, 907 of that frame. Additionally or alternatively, some embodiments control one or more optics 124, 125 (e.g., one or more lenses, mirrors, filters, prisms, etc.) of the imaging system 100 and/or illumination source system 112 to control when illumination being emitted by the illumination source system 112 is directed along the line of sight and/or when the illumination (active and/or passive) is prevented from continuing along the line of sight to the image capture system 108. Further, some embodiments control, during each frame, an amount or intensity level of illumination from one or more illumination source systems 112 that is directed along the line of sight as a function of the changing detected angular velocity relative to one or more thresholds over each respective frame being captured.

For example, in some instances, the illumination source system 112 comprises a shutter laser that has a laser rise time of about 1 microsecond. A time to illuminate the image capture system 108 is dependent on the rise time and based on the distance of travel of the illumination (e.g., a resulting round trip light travel time of about 6 microseconds from a plane flying at about 30,000 feet to a remote location or target and back). Accordingly, the time between activation and detection is minimal relative to the frequency of the angular jitter and/or angular velocity resulting from the jitter, vibration or the like. This allows precise and rapid control over the exposure of the image capture system 108 to the illumination from the one or more illumination source systems 112. Further, this allows for precise control of one or more integration periods of time during a single frame while still exposing the image capture system 108 to sufficient quantities of light to capture an image with a desired resolution and signal to noise ratio.

The duration of the integration during a frame can be preset, or can vary over time, and in some instances varies for each frame. In some embodiments, the duration of an integration period of time or a minimum integration period of time during the frame is dependent on a minimum or intended signal-to-noise ratio (SNR). The minimum and/or desired SNR is typically determined based on mission parameters and/or objectives. In some implementations, for example, an SNR of about 10 dB is desired for some video streaming off of an aircraft to a ground station. Digital processing of frames, however, generally leads to a reduction in the SNR. Thus, the SNR for a given mission or aircraft is typically chosen so that the final SNR at the receiving system or station is about 10 dB after image processing that is performed through one or more systems on the aircraft before streaming the frames and/or video data to the receiving station (e.g., a ground station, satellite, etc.). It is noted that in other implementations, SNRs of greater than 10 dB may be desired, such as for certain video streams based on a desired or needed resolutions and frequency content of the scene and/or target being captured in the frames, while in still other implementations SNRs of 8 dB or less may be sufficient.

Some embodiments determine a desired integration period of time 706, 806, 906, and/or at least a minimum integration period of time or duration, as a function of the intended SNR and/or minimum SNR. Using the intended SNR, some embodiments set at least a minimum integration period of time to ensure the appropriate number of photons enter the image capture system 108 as calculated from a corresponding system link budget. The system link budget is often dependent on the camera noise, light source, distance to target and/or scene, reflection coefficient of objects, atmospheric losses, other such parameters, or a combination of two or more of such parameters. There are various known approaches to obtaining relevant parameters to determine a relevant integration period of time, and various known approaches to determining a desired integration period to achieve a desired SNR based on relevant parameters, and the present teachings are not overly sensitive to any particular selections in these regards.

Accordingly, in some embodiments, a minimum integration period of time (e.g., 806c, 806e) is set so that at least a desired SNR is achieved based on the identified parameters. Some embodiments, however, improve the image quality, resolution, SNR and/or extend the collected or integrated signal power without compromising image resolution by extending the integration period of time 806 beyond the minimum integration period as a function of the detected angular velocity. In some implementations, integration during a frame period 720 is activated when the detected angular velocity of the image capture system 108 and/or the intended light of sight has dropped below the angular velocity threshold 504. Instead of integrating the signal for a fixed duration (e.g., the minimum integration period), the image capture system 108 is controlled to continue to integrate the signal while the detected angular velocity or angular displacement (e.g., determined by integrating gyroscope measurements) has not exceeded the angular velocity threshold 504 (e.g., threshold of root mean square (RMS) jitter) and/or other threshold. In some embodiments, the applied RMS jitter threshold is determined a function of the desired image resolution and can be readily defined using typical modulation transfer function (MTF) curves. When the RMS jitter threshold has been exceeded before the minimum integration period of time and/or a minimum SNR has been reached, the image capture control circuit 106 continues to activate the image capture system 108 to continue to integrate until at least the termination of minimum integration period of time and/or an end of a current frame duration of time 720. Some embodiments determine an intended or desired SNR that is needed to achieve a desired image and/or resolution. Based on the determined SNR, the image capture control circuit 106 determines a minimum integration period (e.g., in milliseconds) to achieve sufficient integration. The detected and/or expected angular velocity caused by vibration and/or jitter relative to the desired SNR is used to determine an integration period to achieve the intended SNR. As such, some embodiments attempt to set the angular velocity threshold 504 through an iterative calibration process to maximizing the integration period (and thus the amount of image signal from the image capture system) while minimizing the exposure to vibration, jitter and/or other movement. As described above, this iterative process can be repeated numerous times while images are captured.

Further, the system can be implemented in a passive mode or an active mode, which can depend on an amount of light available and/or whether an illumination source system 112 is included. In an active mode, the illumination source system 112 is activated to acts as the light source to emit light toward the subject. In some embodiments, the illumination source system 112 is activated and deactivated in conjunction with the integration periods of time while the image capture system 108 is activated. In some embodiments, when operating in a passive mode, where the sun or other radiation source external to the imaging system 100 and/or the vehicle carrying the imaging system provides the illumination, the image capture system 108 is operated with variable integration times, and integration starting location can be obtained as inputs into the system to reference sequential images.

In some embodiments, the image capture control circuit 106 further registers and/or obtains location information and/or orientation information relative to each frame and/or captured image. This location and/or orientation information enables precision alignment between frames of a set of frames captured over time, and allows for movement of the vehicle and/or the image capture system 108 over time while providing a correlation between frames. In some embodiments, the image capture control circuit 106 obtains location and/or orientation information from the location determination system 130 and/or one or more of the sensor systems. Based on this location and/or sensor information, the image capture control circuit is configured to register an orientation and/or location, relative to a particular frame, of the image capture system 108 during the exposure of the image capture system while capturing that frame and/or registers the orientation and/or location of the image capture system 108 in association with an orientation of one or more previous frames.

As described above, some embodiments identify when a sensed angular velocity of the image capture system 108 and/or a line of sight of the image capture system exceeds or otherwise has a predefined relationship with an angular velocity threshold 504. The angular velocity threshold 504 can be predefined prior to operation of the imaging system 100, and/or prior to capturing a sequence or set of frames. Some embodiments, however, adjust over time the minimum angular velocity threshold 504 based on one or more factors. An adjustment to the angular velocity threshold may be implemented based on a predefined schedule, in response to one or more external conditions, in response to one or more detected threshold variations, other such factors, or a combination of two or more factors. In some embodiments, the image capture control circuit 106 is further configured to modify in real time the angular velocity threshold 504 prior to a subsequent successive frame as a function of historic angular velocity detected over a set of multiple frames occurring prior to the subsequent successive frame.

Some embodiments, in specifying an angular velocity threshold 504 for a frame and/or a set of subsequent frames, obtain measured angular velocities or an average angular velocity from a set number of previous frames (such as 10 previous frames, 30 previous frames, or other number of frames). In some embodiments, sensor data during each frame is sampled at a predefined sample rate (e.g., 4 kHz (i.e., 0.25 milliseconds) sample points per second), such as sampled sensor data measured from one or more gyroscopes is integrated to determine a time-dependent angular position of the camera line-of-sight over each frame. A pre-select number of different thresholds are used as preliminary test conditions in the previous frames and the resulting root-mean-square (RMS) angular motion is recorded for each of the set of previous frames. For example, predefined velocity thresholds can be defined as 1 mrad/s, 2 mrad/s, 3 mrad/s, etc. This RMS angular motion or jitter is determined as a standard deviation of the angular motion while the image capture system 108 and/or illumination source system 112 are simulated to be on during calibration for a given threshold. Some embodiments use a spline interpolant to fit the RMS jitter results as a function of the threshold value and a minimum is taken and used as an optimized angular velocity threshold 504 for a next subsequent frame when controlling according to the algorithm the exposure of the image capture system 108 in real-time of the next subsequent frame. This angular velocity threshold calibration, in some embodiments, is continually implemented (e.g., as a background calculation) while continuing to capture frames using a rolling average for the angular velocity threshold so that the optimized angular velocity threshold is updated at each frame to ensure up-to-date vibration information is used to reduce the blurring from vibrational motion and/or otherwise enhance image quality. Accordingly, in some embodiments, the image capture control circuit 106 modifies, in real time, the angular velocity threshold 504 prior to a subsequent successive frame, following a current frame, as a function of the historic angular velocity detected over a set of multiple frames occurring prior to the subsequent successive frame.

Figure 10:
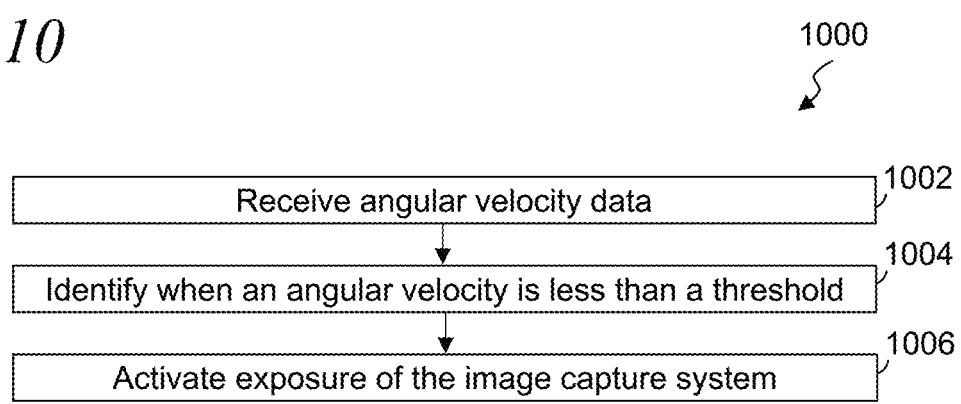
FIG. 10 illustrates a simplified flow diagram of an exemplary process of capturing enhanced resolution images through an image capture system, in accordance with some embodiments.

FIG. 10 illustrates a simplified flow diagram of an exemplary process 1000 of capturing enhanced resolution images through an image capture system 108, in accordance with some embodiments. In some instances, the image capture system is mounted with a stationary platform, secured with or mounted in a vehicle, or secured with other platforms subject to jitter. In step 1002, angular velocity data is received and/or determined from sensor information received from one or more sensor systems 110. The sensor information can include gyroscope data, inertial sensor data, velocity data, acceleration data, other such data, and in some instances two or more of such data. For example, some embodiments obtain sensor data measured from one or more gyroscopes that is integrated to determine a time-dependent angular position of the camera line of sight prior to, during and/or over each frame. Further, in some embodiments, the angular velocity data is received in real-time from the one or more angular velocity sensor systems secured with a mounting 102 (e.g., bench, plate, platform, turret, gimbal, other such mounting or combination of such mounting). Further, in some implementations, the mounting enables movement and/or positioning of at least the image capture system 108, and typically a corresponding illumination source system 112. The mounting is typically positioned within the vehicle and/or secured with the vehicle.

In step 1004, the system identifies, in real-time just prior to and/or during a frame, when an angular velocity change in the line of sight (LOS) angular displacement of an image capture system 108, caused by angular jitter noise, is less than an angular velocity threshold. In step 1006, exposure of the image capture system 108 is activated, during the frame and in response to identifying that the angular velocity is less than the angular velocity threshold, to illumination for at least one of: at least a minimum integration period of time during the frame, and while the angular velocity is less than the angular velocity threshold during the frame. The activation of the image capture system 108 to expose the image capture system to illumination, in some implementations, includes activating the exposure of the image capture system during the frame and continuing that exposure during the frame period 720 while the angular velocity continues to be less than the angular velocity threshold. This enables an exposure for more than the minimum integration period of time during a frame, and in some instances provides for an integration for substantially all or all of a frame while the angular velocity continues to be less than the angular velocity threshold. Similarly, in some embodiments, sequential frames may have different integration periods of time (e.g., 806a, 806f, 806g) because of the variability of the angular velocity over time.

The exposure of the image capture system 108 to the illumination is terminated, in some instances, in response to at least one of a detection, based on the angular velocity data, that the angular velocity exceeds the angular velocity threshold, a frame duration of time 720 of a current frame expires, a threshold integration duration has been achieved, other such conditions, or a combination of two or more of such conditions. Again, the exposure of the image capture system 108 is typically maintained for at least the minimum integration period of time 806e, and in some embodiments, integration by the image capture system 108 is continued without interruption, once activated, for at least the minimum integration period of time 806e. In some implementations, integration may be interrupted prior to the minimum integration period of time based on an ability to implement further integration during the same frame period of time such that a summation of multiple sub-integration periods during a single frame cooperatively achieve a desired integration threshold and/or provide integration for at least the minimum integration period. Accordingly, the image capture control circuit 106, in some embodiments, activates the image capture system 108 repeatedly, during the single frame, activating 908 and deactivating 909 the exposure of the image capture system multiple times during a single frame to the illumination in response to the detected angular velocity transitioning, during the frame, from less than the angular velocity threshold 504 and greater than the same or a different angular velocity threshold 504. Some embodiments, in identifying the angular velocity, integrate gyroscope data received from at least one gyroscope of an angular velocity sensor system 111, and obtain time-dependent angular position of the line-of-sight of the image capture system 108 prior to, during and/or over each frame.

In some embodiments, the imaging system 100 includes one or more illumination source systems 112. The illumination source system 112 may be activated to provide some or all of the illumination that is reflected from the subject and impinges upon the image capture system 108 when preforming at least some of the integration. Accordingly, the image capture control circuit 106, in some embodiments, in activating the exposure of the image capture system 108 is further configured to activate one or more illumination source systems 112 to emit at least some of the illumination. Typically, the illumination source system is activated to emit illumination for at least the minimum integration period of time during the frame.

As described above, the image capture control circuit 106 can activate the image capture system 108 a threshold time or minimum threshold amount of time 716 prior to the end of a frame period of time 720 when the image capture system has not been activated during the frame for at least the minimum integration period of time. Some embodiments detect, during the frame, that the minimum threshold amount of time 716 remains of the frame duration of time 720. The image capture control circuit 106 detects or determines that the exposure of the image capture system 108 has not yet been activated resulting from the angular velocity not having dropped below the angular velocity threshold 504 during the frame, and/or that the accumulated exposure duration of the image capture system 108 from repeated activations and deactivations during the single frame is not greater than or equal to the same or a different minimum integration period of time. In response to detecting that the minimum threshold amount of time 716 remains during the frame and determining that the exposure of the image capture system has not been activated during the frame, the exposure of the image capture system 108 is activated for at least the minimum integration period of time 806e during the frame.

The image capture system 108 can repeatedly capture a series of frames and/or video content comprising a series of frames captured at a selected frame rate. Some embodiments further register an orientation of the image capture system just prior to a frame, and/or just prior to or during the exposure of the image capture system and in association with an orientation of one or more previous frames. The registered orientation in association with orientations of the image capture system during previous frames enables the subsequent correlation of sequential frames and enable the evaluation of sequential frames relative to a given orientation. It may be identified over time that the angular velocity threshold should be modified. Some embodiments consider history angular velocities, historic angular velocities, and/or other factors. In some implementations, the angular velocity threshold 504 is modified in real-time prior to sequential frames (e.g., a current frame and a subsequent successive frame) as a function of historic angular velocity detected over a set of multiple frames occurring prior to the subsequent successive frame.

Further, in some embodiments, the minimum integration period of time is determined in order to obtain an image or frame that complies with one or more criteria and/or thresholds. External illumination characteristics corresponding to a subject being imaged by the image capture system are obtained in some embodiments. The illumination characteristics can include, but are not limited to a level of external light (e.g., luminous flux, radiant flux, etc.), level of particulate matter in the air, distance to subject, expected levels of interference, other such characteristics, and typically a combination of such characteristics. A signal to noise ratio threshold is accessed. The signal to noise ratio may be predefined and stored locally in the image capture control circuit 106, communicated to the imaging system 100 from a remote source (e.g., a remote central control center, a military headquarters, other such source, or a combination of two or more of such sources), stored in a local database and/or table (which may define multiple different signal to noise ratios that are to be used dependent on one or more factors, such as but not limited to a type of subject or target being imaged, a time of day or night, a vehicle with which the imaging system 100 is mounted, a geographic location of a subject and/or the vehicle when the image is being captured, other such factors or conditions, or a combination of two or more of such factors and conditions), and/or accessed from one or more other sources. The minimum integration period of time is determined, in some embodiments, as a function of at least both the signal to noise ratio threshold, and one or more of the illumination characteristic.

Figure 11:
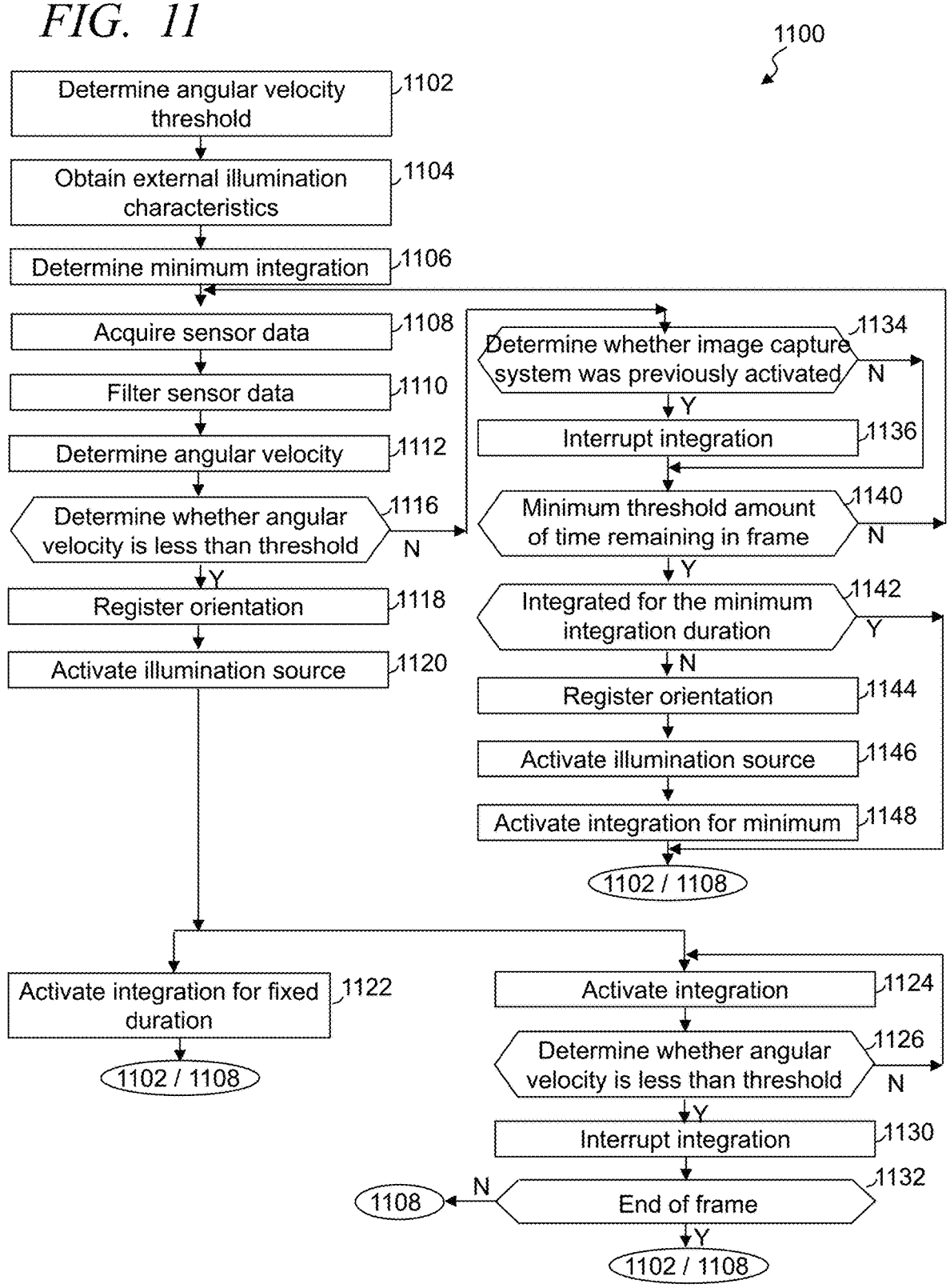
FIG. 11 illustrates a simplified flow diagram of an exemplary process of capturing enhanced resolution images through an image capture system, in accordance with some embodiments.

FIG. 11 illustrates a simplified flow diagram of an exemplary process 1100 of capturing enhanced resolution images through an image capture system 108, in accordance with some embodiments. Some embodiments include step 1102 where an angular velocity threshold 504 is determined for a next frame. As described above, some embodiments utilize historic angular velocity information acquired over set of preceding frames and/or a threshold duration of time and determine or modify in real-time the angular velocity threshold 504 prior to a next frame as a function of historic angular velocity detected over a set of multiple frames occurring prior to the subsequent successive frame.

Some embodiments include step 1104, where external illumination characteristics and/or imaging system characteristics are acquired. In step 1106, a minimum integration period of time is set for a next frame based on the external illumination characteristics and/or the imaging system characteristics to achieve an intended signal to noise ratio. In step 1108, sensor data is acquired from the one or more sensor systems 110. Step 1110 may be included where some or all of the sensor data is filtered and/or processed at least to account for measurement noise. In step 1112, an angular velocity of image capture system 108 and/or the line of sight of the image capture system 108 based on the sensor data. For example, some embodiments integrate gyroscope data received from the one or more gyroscopes and used to obtain angular velocity and/or time-dependent angular position of the line-of-sight of the image capture system prior to and/or during one or more frames.

In step 1116, it is determined whether the determined angular velocity as a predefined relationship with the angular velocity threshold 504. Again, in some embodiments, this angular velocity threshold 504 is set and/or modified for a current frame and/or modified over time, such as in step 1102. In some embodiments, when the angular velocity has the predefined relationship with the angular velocity threshold, the process 1100 advances step 1118 where an orientation of the image capture system 108 is registered to enable appropriate correlation and/or alignment between sequential frames. Further, some embodiments include step 1120 where an illumination source system 112 is activated when the illumination source system is included in the imaging system 100 and illumination is desired, such as to achieve a desired signal to noise ratio based on the external illumination characteristics.

In some embodiments, the imaging system 100 can operate to capture images using a fixed duration of integration duration, or may apply a variable integration duration based on changes of the detected angular velocity of the image capture system 108 and/or line of sight of the image capture system. The path may be predefined, may be determined over time based on one or more factors (e.g., historic angular velocity measurements, desired signal to noise ratio, external illumination characteristics, etc.). For example, the path may be selected when historic angular velocity measurements are greater than the angular velocity threshold for more than a threshold period of a threshold number of previous frame, selected in response to a threshold change in external illumination characteristics, selected in response to a frame rate, other such factors, or a combination of two or more of such factors. As such, in some embodiments, the process 1100 advances to step 1122, in response to determining that the angular velocity is less than the angular velocity threshold 504, where the image capture system 108 is activated for a fixed duration of time. The fixed duration is at least equal to the minimum integration period. In other implementations, however, the fixed duration may be greater than the minimum integration period. The fixed duration may be predefined, determined based on historic angular velocity, determined as a function of signal to noise ratios obtained in one or more prior frames, a desired signal to noise ratio, other such factors, or a combination of two or more of such factors. Following the fixed duration, the process 1100 returns to step 1102 to prepare for a subsequent frame and/or step 1108 to further evaluate the angular velocity data during the current frame.

In some implementations, the process 1100 advances to step 1124 in response to a detection that the detected angular velocity is less than the angular velocity threshold 504, where the image capture system 108 is activated and initiates integration. In some instances, the integration remains active in step 1124 for at least a minimum integration duration. In step 1126 it is determined whether the determined angular velocity as a predefined relationship with the same or a different angular velocity threshold 504 as considered in step 1116. While the detected angular velocity continues to have the predefined relationship with the angular velocity threshold 504, integration continues and the process loops to step 1124. Alternatively, when the detected angular velocity does not have the predefined relationship with the angular velocity threshold 504, the process 1100 continues to step 1130 where the image capture system 108 is controlled to interrupt the integration. In step 1132 it is determined whether the end of the current frame period of time 720 has expired and/or the current frame has ended. When the frame period of time has not ended the process returns to step 1108 to continue to monitor the sensor data during the current frame.

Some embodiments, following the determination in step 1116 that the angular velocity does not have the predefined relationship with the angular velocity threshold 504, includes step 1134 where it is determined whether the image capture system 108 was activated during the current frame period 720. When the image capture system 108 was previously activated, the process advances to step 1136 where the image capture system is controlled to interrupt or halt the integration during the current frame. In step 1140, it is determined whether the amount of time remaining of the current frame duration of time 720 is equal to or less than a minimum threshold amount of time 716. When the amount of time remaining during a current frame period is greater than the minimum threshold amount of time 716 of the frame period the process returns to step 1108 to continue to evaluate the angular velocity of the image capture system 108. Some embodiments alternatively continue to step 1142, when the amount of remaining time of the frame period is less than or equal to the minimum threshold amount of time 716 of the frame duration of time 720, where it is optionally determined whether the image capture system 108 was previously activated to integrate during the current frame for at least the minimum integration period of time 806c, 806e, or another threshold duration. This may include identifying durations of multiple sub-integrations during the single frame sum to be greater than the minimum integration period of time, while in other instances the system may determine whether at least one sub-integration was at least as long as the minimum integration period of time. When the integration during the current frame is equal to or greater than the minimum integration period of time, the process may not initiate further integration during the current frame. Further, the process 1100 typically returns to step 1108 to continue to monitor angular velocity for the next frame, and/or returns to step 1102 to determine for a subsequent frame whether to adjust the angular velocity threshold and/or adjust the minimum integration period of time.

When integration is to be activated, some embodiments advance to step 1144 where an orientation of the image capture system 108 is registered to enable appropriate correlation and/or alignment between sequential frames. Some embodiments include step 1146 where an illumination source system 112 is activated when the illumination source system is included in the imaging system 100 and illumination is desired, such as to achieve a desired signal to noise ratio based on the external illumination characteristics. In step 1148, the image capture system 108 is activated to implement integration for at least the minimum integration period of time 806e prior to the termination of the current frame duration of time 720 and the current frame. When further frames are to be captured, the process 1100 typically returns to step 1102 to determine for a subsequent frame whether to adjust the angular velocity threshold and/or adjust the minimum integration period of time or to step 1108 to continue to monitor angular velocity for the next frame.

As introduced above and described further below, some embodiments utilize one or more other jitter compensation systems to improve images captured and compensate for jitter and/or noise vibrations that can adversely affect image quality of images captures by the imaging system 100 cooperated with a vehicle or other moving platform. Accordingly, the process 1100 may include one or more additional steps regarding the activation of or cooperative use of one or more other jitter compensation systems and/or processes. In some embodiments, for example, a process is implemented to evaluate angular displacement of the image capture system 108 relative to one or more angular displacement thresholds and/or an angular displacement threshold envelope. The consideration of the angular displacement thresholds, in some embodiments, prevent integration until the angular velocity has the predefined relationship with the angular velocity threshold, and the angular displacement is within an angular displacement threshold envelope. In other embodiments, the angular velocity dictates the initiation of integration, while the consideration of the angular displacement threshold envelope is evaluated to determine whether to interrupt integration during the current frame. Similarly, in some embodiments, the evaluation of angular displacement relative to the angular displacement threshold envelope is considered when it is determined in step 1134 that integration was previously activated during a current frame period of time 720.

Figure 12:
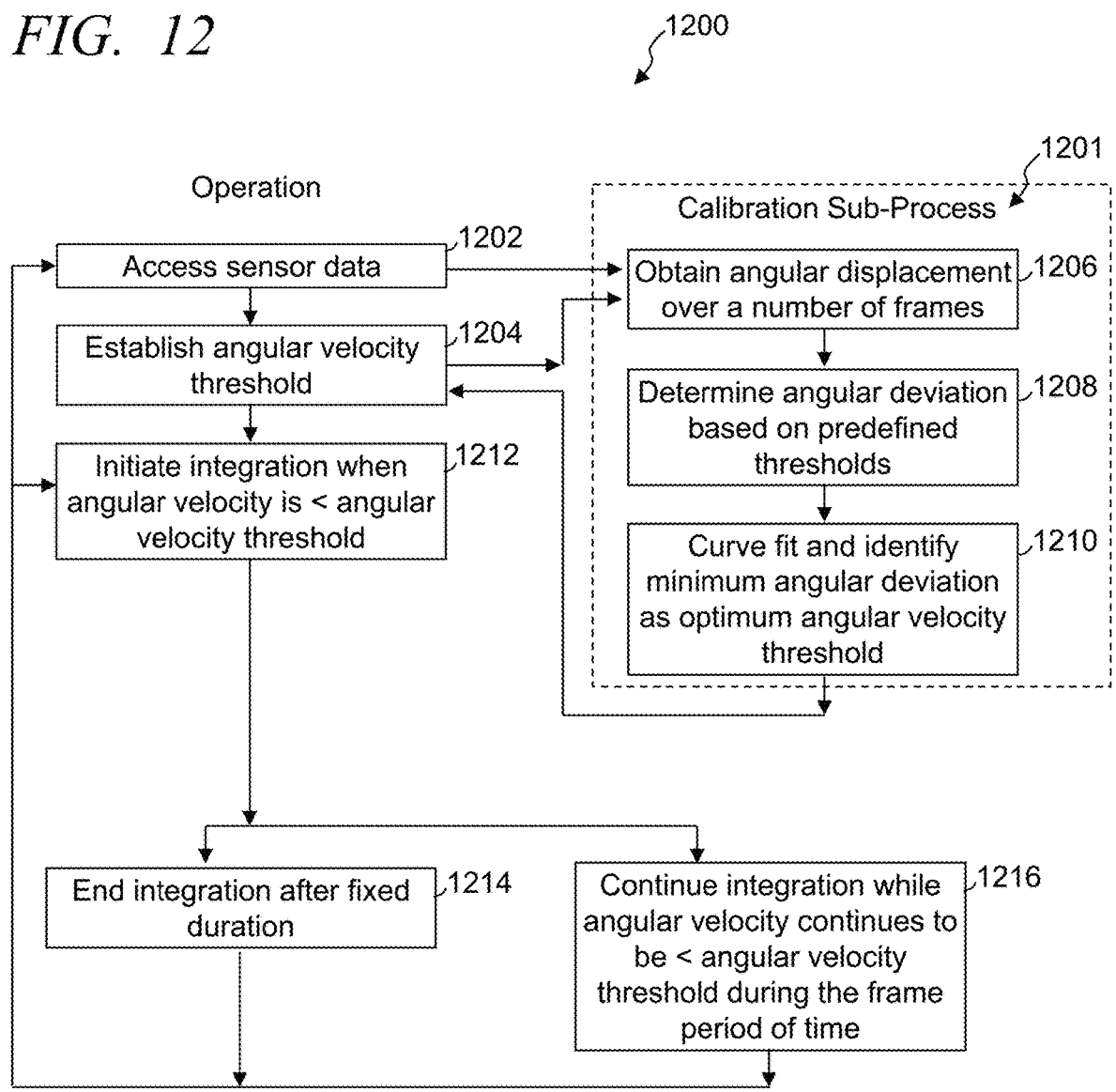
FIG. 12 illustrates a simplified flow diagram of an exemplary process of capturing enhanced resolution images through an image capture system, in accordance with some embodiments.

FIG. 12 illustrates a simplified flow diagram of an exemplary process 1200 of capturing enhanced resolution images through an image capture system 108, in accordance with some embodiments. In step 1202, sensor data is obtained from one or more sensor systems 110, such as but not limited to one or more gyroscopes, one or more accelerometers, one or more velocity sensor systems, other such sensor systems, or a combination of two or more of such sensor systems. For example, some implementations determine the angular velocity as measured from the gyroscopes that is integrated to determine the time-dependent angular position of the image capture system 108 line of sight over each frame. Some embodiments optionally include step 1204 where an angular velocity threshold 504 is established and/or obtained. The velocity threshold, in some embodiments, is predefined. In other embodiments the velocity threshold may vary over time, and in some instances, may be varied between sequential frames.

A calibration sub-process 1201 is implemented, in some embodiments, at least in part to establish the angular velocity threshold 504. In step 1206, angular displacement information and/or relevant angular displacement and/or velocity sensor information is obtained for a set of multiple previous frames (e.g., a previous 30 frames, a previous 60 frames, or other such numbers of frames). In step 1208, a select number of different predefined test thresholds are used as test cases relative to the sensor data from the previous frames and a resulting root-mean-square (RMS) angular motion is determined for each of the previous number of frames and each of the test thresholds. This RMS jitter is determined as the standard deviation of the angular motion while an image capture system 108 is activated and/or simulated to be active calibration for a given one of the predefined test thresholds. Some embodiments include optional step 1210 where a spline interpolant or other curve fit is used to fit the RMS jitter results as a function of the test threshold value, and a minimum is identified. This identified minimum is used as the optimized angular velocity threshold 504 established in step 1204 and when evaluating angular velocity during at least a next frame. This calibration is performed in real-time in some embodiments is ongoing as a background calculation while the algorithm is operational by using a rolling average so that the angular velocity threshold can be updated at each frame to provide up-to-date vibration information is being used to reduce the blurring from vibrational motion.

In step 1212, sensor data from the one or more sensor systems 110 is used to determine current angular velocity during a current frame, and the current angular velocity is evaluated relative to the angular velocity threshold 504 set for at least the current frame to identify when, during the frame, the angular velocity is less than the angular velocity threshold 504, and activate the integration by the image capture system 108. The step 1212 can be repeated any number of times during a frame to continue to monitor over the frame the angular velocity of the image capture system and/or line of sight of the image capture system, and identify when the angular velocity is less than the angular velocity threshold.

When the determined angular velocity is less than the angular threshold and/or in response to activating the integration by the image capture system, the process 1200, in some embodiments, advances to one of steps 1214 and 1216. In step 1214, the integration by the image capture system is terminated after a predefined fixed duration. In other embodiments, the process advances to step 1216 where the image capture system is controlled to continuously integrate during the frame period of time as long as the detected angular velocity remains below the angular velocity threshold 504 set for the current frame. As such, the integration period may be variable. In some embodiments, during the same frame and frame period of time, the process 1200 returns to step 1212 to continue to monitor the angular velocity. As such, some embodiments may activate the integration by the image capture system 108 more than one time per frame. Again, the activation of integration may be for a fixed duration (e.g., step 1214), or may be variable (e.g., step 1216) while the detected angular velocity during the current frame remains below the angular velocity threshold. Still further, in some embodiments, step 1204 and/or step 1202 can be activated prior to a subsequent frame to continue to access sensor data and/or establish a subsequent angular velocity threshold 504 for the subsequent frame. Accordingly, the process 1200 can repeatedly continue while images continue to be captured, and/or as part of a pre-calibration process that is implemented prior to capturing images of interest.

As described above and further below, some embodiments utilize one or more other jitter compensation systems in cooperation with or separate from the jitter compensation system that tracks angular velocity and controls integration by the image capture system 108 and/or one or more illumination source systems 112. For example, some embodiments utilize a second jitter compensation system that provides mechanical stabilization systems that apply mechanical techniques that attempt to compensate for at least some movement of the image capture system 108. Some embodiments additionally or alternatively include a second jitter compensation system using angular displacement and controls integration by the image capture system 108 based on the angular displacement having a predefined relationship with one or more angular displacement thresholds.

Some embodiments are utilized in cooperation with a second jitter compensation system to implement a second technique of angular displacement mitigation to mitigate the effect of the line of sight angular displacement of the image capture system 108, such as one or more embodiments described in U.S. application Ser. No. 15/963,634, filed Apr. 26, 2018, by Patrick R. Mickel et al., and entitled SYSTEMS AND METHODS TO MITIGATE ADVERSE JITTER EFFECTS IN MOBILE IMAGING, which is incorporated herein by reference in its entirety. Further, the second technique of angular displacement mitigation is a different technique than the first technique of angular displacement mitigation, wherein the second jitter compensation system is configured to operate in cooperation with the first jitter compensation system.

Figure 13:
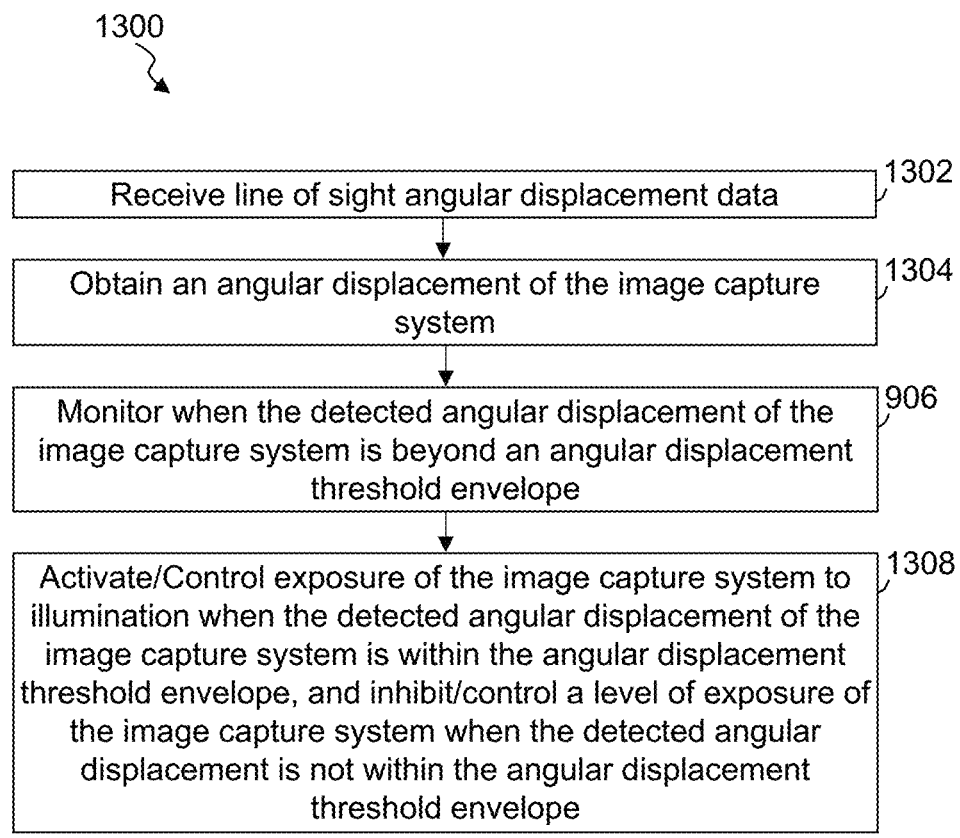
FIG. 13 illustrates a simplified flow diagram of an exemplary process of capturing enhanced resolution images, in accordance with some embodiments
Figure 14:
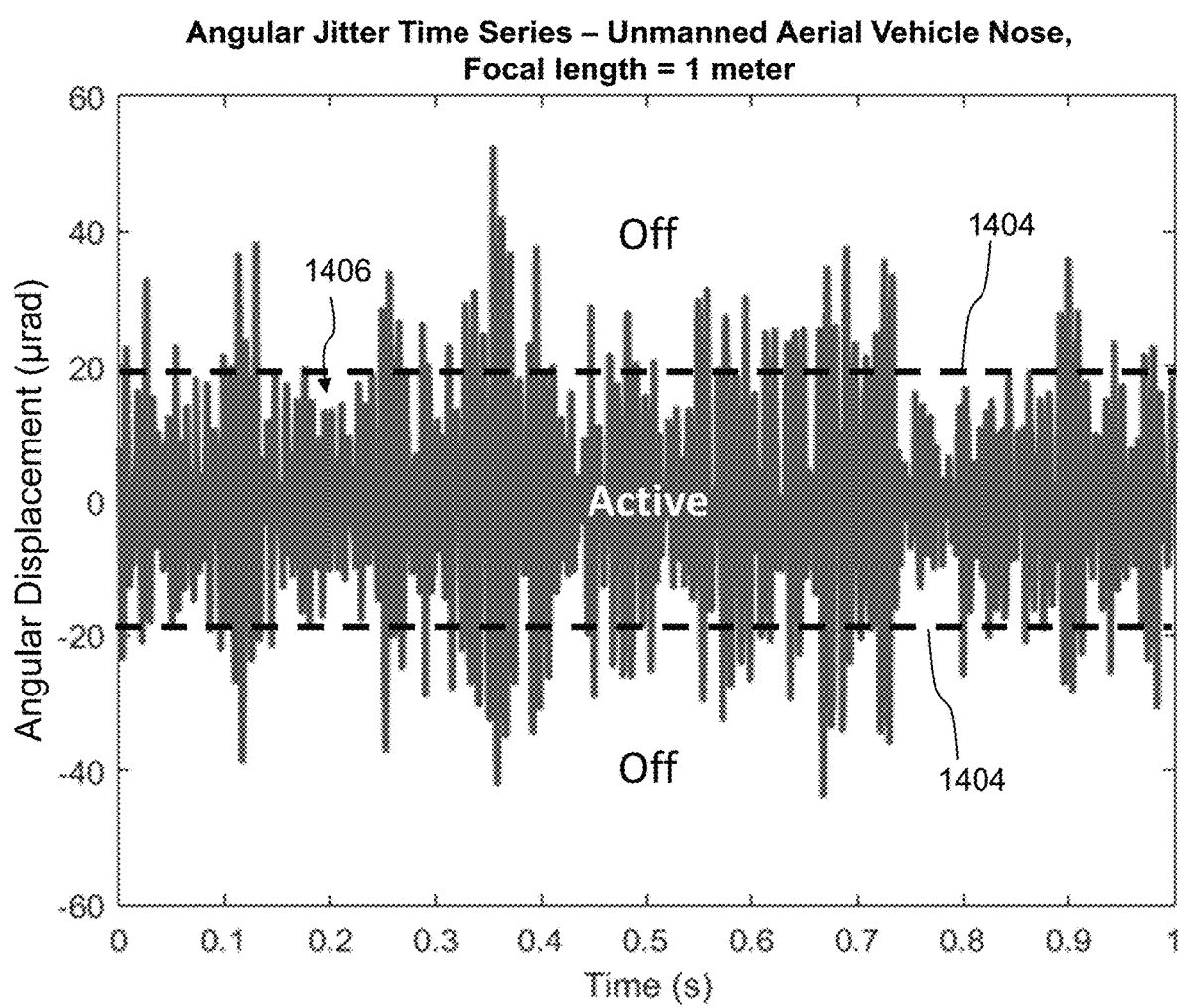
FIG. 14 illustrates a simplified graphical representation of exemplary angular displacement (in microradians) versus time based on sensor data, in accordance with some embodiments.

FIG. 13 illustrates a simplified flow diagram of an exemplary process 1300 of capturing enhanced resolution images from a moving vehicle implementing a second jitter compensation technique of angular displacement mitigation to mitigate the effect of the line of sight (LOS) angular displacement of the image capture system, in accordance with some embodiments. FIG. 14 illustrates a simplified graphical representation of exemplary angular displacement (in microradians) versus time based on sensor data from one or more sensor systems 110, in accordance with some embodiments. For example, in some implementations, one or more gyroscopes provide relatively high bandwidth acceleration data (e.g., in the range of a vibration profile of about 3 kHz or higher). One or more angular displacement thresholds 1404 can be defined to be used in controlling exposure of the image capture system 108 to illumination (e.g., a positive or first directional threshold, and a negative or second directional threshold). In some embodiments, an angular displacement threshold envelope 1406 is defined between two or more angular displacement thresholds. The boundaries or thresholds 1404 of the angular displacement threshold envelope 1406 may be equal magnitudes from a zero or may be unequal depending on the angular displacement being detected or estimated, and/or other sensor data being detected. The envelope boundaries and/or thresholds can be dependent on one or more factors such as detected displacement, amplitude and/or frequency of vibration, resulting signal to noise ratios of captured images, and other such factors. As one example, in some implementations, the displacement threshold envelope 1406 may be +/−20 microradians. Again, one or more factors may affect the displacement threshold envelope 1406.

Referring back to FIG. 13, the process 1300 is implemented, in some embodiments, through the imaging system 100. Further, the process 1300 can be implemented as part of one or more of processes 1000, 1100 and 1200. For example, one or more of the steps of the process 1300 can be implemented in parallel with one or both of steps 1004 and 1006, one or more of steps 1116, 1122, 1124, 1126 and/or 1134, and/or one or more of steps 1212, 1214 and 1216. In step 1302, line of sight angular displacement data is received, in real-time prior to and while images are being captures, from one or more of the sensor systems 110, which in some implementations are secured with the mounting 102, which is typically secured with a vehicle. In step 1304, an angular displacement of an image capture system is obtained during a capture frame and/or during a frame duration of time 720. Some embodiments continuously obtain and/or determine the angular displacement information of the imaging system 100 and/or the image capture system 108.

In step 1306, the detected angular displacement is monitored to detect when the detected angular displacement of the image capture system, based on the line of sight angular displacement data, is within or beyond one or more angular displacement thresholds 1404, or one or more angular displacement threshold envelopes 1406. In step 1308, the exposure of the one or more image capture systems 108 to the illumination from the target is activated and/or one or more of the image capture control circuit 106 are activated to initiate integration when the detected angular displacement of the image capture system 108 and/or the imaging system 100 is within the angular displacement threshold envelope 1406. The illumination from the target may be ambient illumination, illumination from one or more illumination source system 112, and/or other illumination. Further, in some embodiments, the image capture control circuit 106 inhibits and/or controls a level of the exposure of the one or more image capture systems 108 to the illumination from the target (e.g., from one or more illumination source systems 112), during the capture frame, when the detected angular displacement is not within the angular displacement threshold envelope 1406, which may establish sub-integration periods of the single frame. The process 1300 can be repeated one or more times during each frame period of time for each frame captured. Some embodiments may repeat some or all of the process 1300 prior to one or more frames. Further, one or more of the steps of the process 1300 may be dependent on one or more other conditions. For example, in some embodiments, step 1308 is dependent on both the angular displacement being within the displacement threshold envelop and the angular velocity being less than the angular velocity threshold 504. In other embodiments, the image capture system can be activated based on the angular displacement independent of the angular velocity. Still further, in some embodiments, the process 1300 may further register an orientation of the image capture system prior to and/or in response to an activation of the image capture system.

Figure 15:
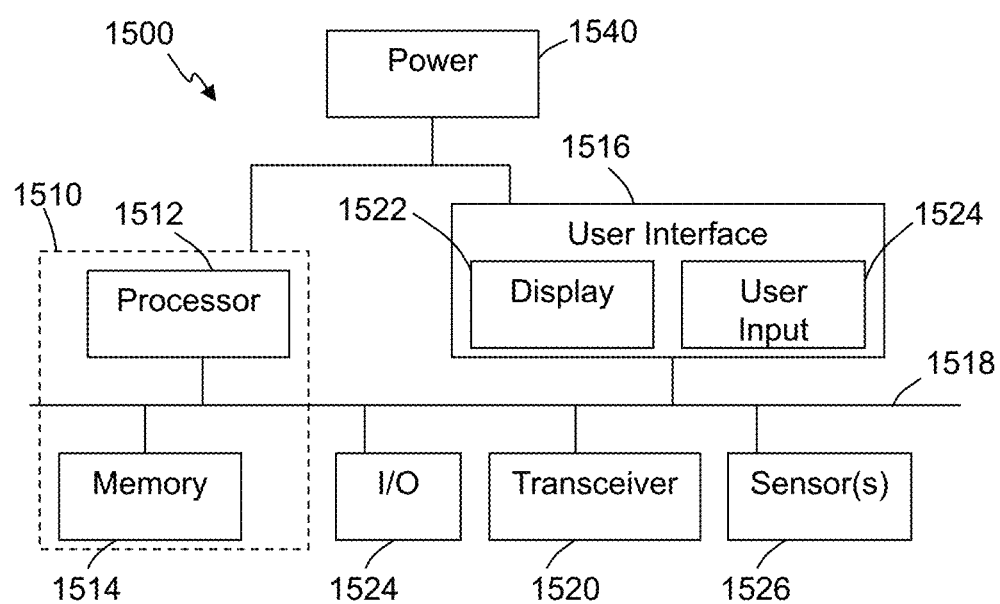
FIG. 15 illustrates an exemplary system for use in implementing methods, processes, techniques, circuits, systems devices and the like in capturing enhanced resolution images while compensating for jitter and/or noise causing movement of an image capture system, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 15 illustrates an exemplary system 1500 that may be used for implementing any of the components, circuits, circuitry, systems, functionality, apparatuses, processes, or devices of the imaging system 100 of FIG. 1, and/or other above or below mentioned systems or devices, or parts of such circuits, circuitry, functionality, systems, apparatuses, processes, or devices. For example, the system 1500 may be used to implement some or all of image capture control circuit 106, image capture system 108 and/or control circuit of the image capture system, the illumination source system 112, the sensor systems 110, the mechanical stabilization control circuit 116, and/or other such components, circuitry, functionality and/or devices. However, the use of the system 1500 or any portion thereof is certainly not required.

By way of example, the system 1500 may comprise a control circuit or processor module 1512, memory 1514, a user interface 1516, and one or more communication links, paths, buses or the like 1518. One or more power sources and/or supplies 1540 are included in or coupled with the system 1500. The control circuit 1512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1512 can be part of control circuitry and/or a control system 1510, which may be implemented through one or more processors with access to one or more memory 1514 that can store instructions, code and the like that is implemented by the control circuit and/or processors to implement intended functionality. Again, the system 1500 may be used to implement one or more of the above or below, or parts of, components, circuits, systems, processes and the like.

In some embodiments, the user interface 1516 can allow a user to interact with the system 1500, receive information through the system, view captured images, and the like. In some instances, the user interface 1516 includes a display 1522 and/or one or more user inputs 1524, such as buttons, touch screen, track ball, keyboard, mouse, remote control, etc., which can be part of or wired or wirelessly coupled with the system 1500.

Typically, the system 1500 further includes one or more communication interfaces, ports, transceivers 1520 and the like allowing the system 1500 to communicate over a communication bus, a distributed network, a local network, the Internet, communication link 1518, other networks or communication channels with other devices and/or other such communications or combinations thereof. Further, the transceiver 1520 can be configured for wired, wireless, optical, fiber optical cable, satellite, or other such communication configurations or combinations of two or more of such communications.

Some embodiments include one or more input/output (I/O) ports 1534 that allow one or more devices to couple with the system 1500. The I/O ports can be substantially any relevant port or combinations of ports, such as but not limited to USB, Ethernet, or other such ports. The I/O interface 1534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 1500 comprises an example of a control and/or processor-based system with the control circuit 1512. Again, the control circuit 1512 can be implemented through one or more processors, controllers, central processing units, logic, software and the like. Further, in some implementations the control circuit 1512 may provide multiprocessor functionality.

The memory 1514, which can be accessed by the control circuit 1512, typically includes one or more processor-readable and/or computer-readable media accessed by at least the control circuit 1512, and can include volatile and/or nonvolatile media, such as RAM, ROM, EEPROM, flash memory and/or other memory technology. Further, the memory 1514 is shown as internal to the control system 1510; however, the memory 1514 can be internal, external or a combination of internal and external memory. Similarly, some or all of the memory 1514 can be internal, external or a combination of internal and external memory of the control circuit 1512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory. The memory 1514 can store code, software, executables, scripts, data, content, lists, programming, programs, log or history data, and the like. While FIG. 15 illustrates the various components being coupled together via a bus, it is understood that the various components may actually be coupled to the control circuit and/or one or more other components directly.

One or more of the embodiments, methods, processes, approaches, and/or techniques described above or below may be implemented in one or more computer programs executable by a processor-based system. By way of example, such a processor based system may comprise the processor based system 1100, a computer, microcomputer, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing embodiments of the above or below described steps, processes or techniques to capture images. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps described above or below.

Some embodiments include one or more jitter compensation systems that can operate independently, or one or more of the jitter compensation systems may cooperatively operate and/or may be interdependent. For example, a first jitter compensation system is provided in some embodiments to implement a first technique of angular displacement mitigation to mitigate an effect of line of sight (LOS) angular displacement of the image capture system. The first jitter compensation system, in some embodiments, comprises an angular velocity sensor system cooperated with the mounting and configured to detect velocity of change of LOS angular displacement of the image capture system caused by angular jitter noise; an image capture control circuit communicatively coupled with the angular velocity sensor system and the image capture system, wherein the image capture control circuit, during each frame of the series of frames, is configured to: receive, in real-time, angular velocity data from the angular velocity sensor system; identify, in real-time during the frame, when an angular velocity is less than an angular velocity threshold; and activate, during the frame and in response to identifying that the angular velocity is less than the angular velocity threshold, exposure of the image capture system to illumination for at least one of: at least a minimum integration period of time during the frame, and while the angular velocity is less than the angular velocity threshold during the frame.

Further, one or more embodiments comprise a second jitter compensation system to implement a second technique of angular displacement mitigation to mitigate the effect of the LOS angular displacement of the image capture system. The second technique of angular displacement mitigation is different than the first technique of angular displacement mitigation. In some embodiments, the second jitter compensation system is configured to operate in cooperation with the first jitter compensation system, and the second jitter compensation system comprises: an angular jitter sensor system coupled to the mounting and configured to detect angular jitter noise causing line of sight (LOS) angular displacement of the image capture system; the illumination source system cooperated with the mounting; and the image capture control circuit. The image capture control circuit, during each frame of the series of frames, is configured to: receive, in real-time, LOS angular displacement data from the angular jitter sensor system; obtain, during the frame, an angular displacement of the image capture system and monitor when the detected angular displacement of the image capture system, based on the LOS angular displacement data, is within an angular displacement threshold envelope; and activate exposure of the image capture system to illumination, multiple times during the frame, when the detected angular displacement of the image capture system is within the angular displacement threshold envelope and the angular velocity is less than the angular velocity threshold.

Some embodiments provide systems and methods for imaging systems to reduce jitter-induced blur as caused by the mechanical vibrations of the platform summed over the integration period of the image capture system. Prior imaging techniques typically have a set integration time that occurs at a fixed timing (generally the beginning of a frame) of an imager's frame rate window. Previous approaches to reduce platform jitter include either reducing the integration time, which is not always possible, mechanically damping or inducing desire vibrations, which typically cannot address most vibration induced changes in angular velocity, or using an additional optical element (e.g., fast stirring mirror) to account for the platform vibrations.

The imaging system 100, in some embodiments, measures the platform vibrations and uses that information to intelligently decide when to integrate over some or all of the duration of the frame without requiring mechanical or optical intervention, or that is used in cooperation with mechanical, optical and/or other compensation systems and/or methods. Some embodiments include one or more inertial measurement units cooperated with a platform (e.g., gyroscopes, accelerometers, etc.) that measure the platform motion and/or the motion of the image capture system and/or are used to determine an estimated angular velocity of the image capture system 108 and/or a line of sight of the image capture system. In some embodiments, an angular velocity threshold is specified and the imaging system is activated to initiate integration and the imaging duration begins when the measured angular velocity drops below the angular velocity threshold. Thus, the one or more integration windows and/or integration periods of time 706, 806 during the frame is defined, in some embodiments, by detecting when the angular velocity from vibrations and/or other noise are relatively low or minimized. The integration period of time can be fixed or variable for a given frame once the integration has begun, with the exposure cutoff, in some instances, in response to angular velocity exceeding one or more angular velocity thresholds 504, which typically would result in a total blur or intensity threshold being passed. The integration time can be varied frame-to-frame, and/or the number and/or duration of sub-integrations during a frame can be varied frame-to-frame, so that the signal-to-noise ratio can be maximized while remaining below some defined jitter threshold.

This technique can be used in both active and passive imaging to intelligently reduce the effects of platform vibrations that lead to jitter. This improves image resolution, which enables better target identification and/or tracking. This technique can be used to improve the resolution of an image, improve the SNR by allowing longer integration pulses that are started during times of relatively low velocity and/or low vibration, other such improvements, or a combination of two or more of such improvements. This enables missions that have longer stand off ranges, smaller vehicles (e.g., smaller UAVs), and/or other such conditions. With the effects of jitter minimized and image resolution maximized, a new set of missions become possible. Simulations have been performed indicating the adverse effects of jitter can be reduced in some instances by 40% or more.

Line of sight jitter is typically considered a limiting factor to high resolution remote sensing imagery. Again, existing techniques often measure the platform jitter and attempt to mechanically counteract its effects. These added mechanical components, in some instances, add additional losses (e.g., reflection from mirrors), are often limited in their frequency response, are typically prone to errors as they involve physically moving a component to oppose the measured vibrations, add additional weight and volume/spacing requirements, have other disadvantages and/or a combination of two or more of such disadvantages.

Some present embodiments can be implemented to utilize the detected angular velocity as a sole vibration and/or noise compensation system. Such embodiments typically do not attempt to reduce the platform vibrations, and instead, identifies instances and/or opportunities where the vibrations and/or angular velocity are relatively low (e.g., below one or more thresholds) to control when to capture an image, which adds a layer of intelligence to the imaging system. Other present embodiments utilize the detected angular velocity and control of integration as one of two or more jitter and/or noise compensation systems and/or processes. These embodiments may additionally utilize mechanical stabilization and/or attempt to mechanically compensate for movement and/or jitter, control integration additionally or alternatively as a function of the changing detected angular displacement relative to one or more threshold envelopes over each respective frame being captured.

In some embodiments, enhanced resolution imaging systems are provided that are configured to be secured with a vehicle, such as but not limited to an aerial vehicle, car, truck, ship, and/or other such vehicle. An enhanced resolution imaging system, in some embodiments comprises: a mounting configured to secure with the vehicle; an electro-optical image capture system cooperated with the mounting, wherein the image capture system is configured to sequentially obtain a series of frames per second; and a first jitter compensation system to implement a first technique of angular displacement mitigation to mitigate an effect of line of sight (LOS) angular displacement of the image capture system, comprising: an angular velocity sensor system cooperated with the mounting and configured to detect velocity of change of LOS angular displacement of the image capture system caused by angular jitter noise; and an image capture control circuit communicatively coupled with the angular velocity sensor system and the image capture system, wherein the image capture control circuit, during each frame of the series of frames, is configured to: receive, in real-time, angular velocity data from the angular velocity sensor system; identify, in real-time during the frame, when an angular velocity is less than an angular velocity threshold; and activate, during the frame and in response to identifying that the angular velocity is less than the angular velocity threshold, exposure of the image capture system to illumination for at least one of: at least a minimum integration period of time during the frame, and while the angular velocity is less than the angular velocity threshold during the frame.

Some embodiments provide methods of capturing enhanced resolution images from an aerial vehicle, comprising: by an image capture control circuit: implementing a first jitter compensation technique of angular displacement mitigation to mitigate an effect of line of sight (LOS) angular displacement of an image capture system configured to sequentially obtain a series of frames per second, comprising: receiving, in real-time, angular velocity data from an angular velocity sensor system secured with a mounting secured with the vehicle; identifying, in real-time during the frame, when an angular velocity of change of line of sight (LOS) angular displacement of an image capture system, caused by angular jitter noise, is less than an angular velocity threshold; and activating, during the frame and in response to identifying that the angular velocity is less than the angular velocity threshold, exposure of the image capture system to illumination for at least one of: at least a minimum integration period of time during the frame, and while the angular velocity is less than the angular velocity threshold during the frame.

While the invention herein disclosed has been described by means of specific embodiments, examples and applications thereof, numerous modifications and variations could be made thereto by those skilled in the art without departing from the scope of the invention set forth in the claims.

What is claimed is:

1. An enhanced resolution imaging system secured with a vehicle, comprising:
   a mounting configured to secure with the vehicle;
   an electro-optical image capture system cooperated with the mounting, wherein the image capture system is configured to sequentially obtain a series of frames per second; and
   a first jitter compensation system to implement a first technique of angular displacement mitigation to mitigate an effect of line of sight (LOS) angular displacement of the image capture system, comprising:
      an angular velocity sensor system cooperated with the mounting and configured to detect velocity of change of LOS angular displacement of the image capture system caused by angular jitter noise; and
      an image capture control circuit communicatively coupled with the angular velocity sensor system and the image capture system, wherein the image capture control circuit, during each frame of the series of frames, is configured to:
         receive, in real-time, angular velocity data from the angular velocity sensor system;
         identify, in real-time during the frame, when an angular velocity is less than an angular velocity threshold; and
         activate, during the frame and in response to identifying that the angular velocity is less than the angular velocity threshold, exposure of the image capture system to illumination for at least one of: at least a minimum integration period of time during the frame, and while the angular velocity is less than the angular velocity threshold during the frame.

2. The system of claim 1, wherein the image capture control circuit is configured to continue to activate the exposure of the image capture system during the frame and while the angular velocity continues to be less than the angular velocity threshold, and to terminate the exposure of the image capture system to the illumination, following the minimum integration period of time, in response to one of: detecting, based on the angular velocity data, the angular velocity exceeding the angular velocity threshold and a frame duration of time of the frame expires.

3. The system of claim 1, wherein the image capture control circuit is further configured to:
   detect, during the frame, that a minimum threshold amount of time remains of the frame duration of time;
   detect that the exposure of the image capture system has not yet been activated resulting from the angular velocity not having dropped below the angular velocity threshold during the frame; and
   activate, during the frame and in response to detecting that the minimum threshold amount of time remains and the exposure of the image capture system has not been activated during the frame, the exposure of the image capture system for at least the minimum integration period of time during the frame.

4. The system of claim 1, wherein the image capture control circuit is further configured to register an orientation of the image capture system during the exposure of the image capture system and in association with an orientation of one or more previous frames.

5. The system of claim 1, wherein the image capture control circuit is further configured to modify in real-time the angular velocity threshold prior to a subsequent successive frame as a function of historic angular velocity detected over a set of multiple frames occurring prior to the subsequent successive frame.

6. The system of claim 1, further comprising:
an illumination source system cooperated with the mounting; and
wherein the image capture control circuit is communicatively coupled with the illumination source system, and wherein the image capture control circuit in activating the exposure of the image capture system is configured to activate the illumination source system to emit at least some of the illumination for at least the minimum integration period of time during the frame.

7. The system of claim 1, wherein the image capture control circuit is configured to:
obtain external illumination characteristics corresponding to a target being imaged by the image capture system;
access a signal to noise ratio threshold; and
determine the minimum integration period of time as a function of the signal to noise ratio threshold, and illumination characteristic.

8. The system of claim 1, wherein the angular velocity sensor system comprises at least one gyroscope, wherein the image capture control circuit is configured to integrate gyroscope data received from the at least one gyroscope and obtain time-dependent angular position of the line of sight of the image capture system over each frame.

9. The system of claim 1, further comprising:
a second jitter compensation system to implement a second technique of angular displacement mitigation to mitigate the effect of the LOS angular displacement of the image capture system, wherein the second technique of angular displacement mitigation is different than the first technique of angular displacement mitigation, wherein the second jitter compensation system is configured to operate in cooperation with the first jitter compensation system, and wherein the second jitter compensation system comprises:
an angular jitter sensor system coupled to the mounting and configured to detect angular jitter noise causing line of sight (LOS) angular displacement of the image capture system; and
the image capture control circuit, wherein the image capture control circuit, during each frame of the series of frames, is configured to:
receive, in real-time, LOS angular displacement data from the angular jitter sensor system;
obtain, during the frame, an angular displacement of the image capture system and monitor when the detected angular displacement of the image capture system, based on the LOS angular displacement data, is within an angular displacement threshold envelope; and
activate exposure of the image capture system to the illumination, multiple times during the frame, when the detected angular displacement of the image capture system is within the angular displacement threshold envelope.

10. A method of capturing enhanced resolution images from a vehicle, comprising:
by an image capture control circuit:
implementing a first jitter compensation technique of angular displacement mitigation to mitigate an effect of line of sight (LOS) angular displacement of an image capture system configured to sequentially obtain a series of frames per second, comprising:
receiving, in real-time, angular velocity data from an angular velocity sensor system secured with a mounting secured with the vehicle;
identifying, in real-time during the frame, when an angular velocity change in line of sight (LOS) angular displacement of an image capture system, caused by angular jitter noise, is less than an angular velocity threshold; and
activating, during the frame and in response to identifying that the angular velocity is less than the angular velocity threshold, exposure of the image capture system to illumination for at least one of: at least a minimum integration period of time during the frame, and while the angular velocity is less than the angular velocity threshold during the frame.

11. The method of claim 10, wherein the activating the exposure comprises activating the exposure of the image capture system during the frame and while the angular velocity continues to be less than the angular velocity threshold, and terminating the exposure of the image capture system to the illumination, following the minimum integration period of time, in response to one of: detecting, based on the angular velocity data, the angular velocity exceeding the angular velocity threshold and a frame duration of time of the frame expires.

12. The method of claim 10, further comprising:
detecting, during the frame, that a minimum threshold amount of time remains of the frame duration of time;
detecting that the exposure of the image capture system has not yet been activated resulting from the angular velocity not having dropped below the angular velocity threshold during the frame; and
activating, during the frame and in response to detecting that the minimum threshold amount of time remains and the exposure of the image capture system has not been activated during the frame, the exposure of the image capture system for at least the minimum integration period of time during the frame.

13. The method of claim 10, further comprising:
registering an orientation of the image capture system during the exposure of the image capture system and in association with an orientation of one or more previous frames.

14. The method of claim 10, further comprising:
modifying in real time the angular velocity threshold prior to a subsequent successive frame as a function of historic angular velocity detected over a set of multiple frames occurring prior to the subsequent successive frame.

15. The method of claim 10, wherein the activating the exposure of the image capture system comprising activating an illumination source system to emit at least some of the illumination for at least the minimum integration period of time during the frame.

16. The method of claim 10, further comprising:
obtaining external illumination characteristics corresponding to a target being imaged by the image capture system;
accessing a signal to noise ratio threshold; and
determining the minimum integration period of time as a function of the signal to noise ratio threshold, and illumination characteristic.

17. The method of claim 10, wherein the identifying the angular velocity comprises integrating gyroscope data received from at least one gyroscope of the angular velocity sensor system, and obtaining time-dependent angular position of the line of sight of the image capture system over each frame.

18. The method of claim 10, further comprising:
implementing a second jitter compensation technique of angular displacement mitigation to mitigate the effect of the LOS angular displacement of the image capture system, wherein the second technique of angular displacement mitigation is different than the first technique of angular displacement mitigation, and wherein the second jitter compensation system is configured to operate in cooperation with the first jitter compensation system, comprising:
  receiving, in real-time, LOS angular displacement data from an angular jitter sensor system;
  obtaining, during the frame, an angular displacement of the image capture system and monitoring when the detected angular displacement of the image capture system, based on the LOS angular displacement data, is within an angular displacement threshold envelope; and
  activating exposure of the image capture system to the illumination, multiple times during the frame, when the detected angular displacement of the image capture system is within the angular displacement threshold envelope.

* * * * *